United States Patent
Li et al.

(10) Patent No.: US 10,819,451 B2
(45) Date of Patent: Oct. 27, 2020

(54) METHOD OF REPORTING RSSI MEASUREMENTS IN AN UNLICENSED BAND AND RELATED APPARATUS

(71) Applicant: Huawei Technologies Co., Ltd., Shenzhen (CN)

(72) Inventors: Bingzhao Li, Beijing (CN); Wei Quan, Beijing (CN); Jian Zhang, Beijing (CN); Xiaodong Yang, Shenzhen (CN); Jinhua Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/896,505

(22) Filed: Feb. 14, 2018

(65) Prior Publication Data

US 2018/0241487 A1 Aug. 23, 2018

Related U.S. Application Data

(63) Continuation of application No. PCT/CN2015/087112, filed on Aug. 14, 2015.

(51) Int. Cl.
*H04B 17/318* (2015.01)
*H04W 24/10* (2009.01)
(Continued)

(52) U.S. Cl.
CPC .......... *H04B 17/318* (2015.01); *H04W 16/14* (2013.01); *H04W 24/10* (2013.01); *H04W 48/16* (2013.01); *H04W 88/06* (2013.01)

(58) Field of Classification Search
CPC .... H04B 17/318; H04W 16/14; H04W 48/16; H04W 24/10; H04W 88/06
See application file for complete search history.

(56) References Cited

U.S. PATENT DOCUMENTS 10,219,159 B2 * 2/2019 Baek ............... H04W 16/14
10,334,465 B2 * 6/2019 Vajapeyam ........... H04L 5/0048
(Continued)

FOREIGN PATENT DOCUMENTS

CN 104509197 A 4/2015
EP 1944984 A1 7/2008
(Continued)

OTHER PUBLICATIONS

U.S. Appl. No. 62/109,921_Spec_filed Jan. 30, 2015 (Year: 2015).*
(Continued)

*Primary Examiner* — Ian N Moore
*Assistant Examiner* — Rushil Parimal Sampat
(74) *Attorney, Agent, or Firm* — Slater Matsil, LLP

(57) ABSTRACT

A user equipment obtains configuration information used to detect a received signal strength indicator (RSSI) value of a signal on an unlicensed frequency, samples the signal on the unlicensed frequency at a sampling interval included in the configuration information to obtain RSSI values of the signal on the unlicensed frequency sampled at sampling moments. The user equipment determines statistics on the RSSI values of the signal on the unlicensed frequency within a statistical window, obtains an RSSI value statistical result of the signal on the unlicensed frequency based on the statistics, and reports the RSSI value statistical result to a base station.

14 Claims, 9 Drawing Sheets

(51) Int. Cl.
  *H04W 16/14* (2009.01)
  *H04W 48/16* (2009.01)
  *H04W 88/06* (2009.01)

(56) References Cited

U.S. PATENT DOCUMENTS

| | | | |
|---|---|---|---|
| 2008/0189970 A1 | 8/2008 | Wang et al. | |
| 2013/0322279 A1 | 12/2013 | Chincholi et al. | |
| 2013/0336156 A1 | 12/2013 | Wei et al. | |
| 2014/0036805 A1 | 2/2014 | Sadek et al. | |
| 2015/0085792 A1* | 3/2015 | Reddy | H04W 16/14 370/329 |
| 2016/0007350 A1* | 1/2016 | Xiong | H04W 24/10 370/252 |

FOREIGN PATENT DOCUMENTS

| | | |
|---|---|---|
| EP | 2637437 B1 | 11/2017 |
| JP | 2010516185 A | 5/2010 |
| WO | 2012116489 A1 | 9/2012 |
| WO | 2015109467 A1 | 7/2015 |

OTHER PUBLICATIONS

3GPP TS 36.214, 3rd Generation Partnership Project; Technical Specification Group Radio Network; Evolved Universal Terrestrial Radio Access (E-UTRA); Physical layer; Measurements (Release 12); 17 pages, Mar. 2015, V12.2.0.
3GPP TS 36.300, 3rd Generation Partnership Project; Technical Specification Group Radio Access Network; Evolved Universal Terrestrial Radio Access Network (E-UTRAN); Overall description; Stage 2 (Release 13); 254 pages, Jun. 2015, V13.0.0.
3GPP TS 36.331, 3rd Generation Partnership Project; Technical Specification Group Radio Access Network; Evolved Universal Terrestrial Radio Access (E-UTRA); Radio Resource Control (RRC); Protocol specification (Release 12); 449 pages, Jun. 2015, V12.6.0.
3GPP TS 36.443; 3rd Generation Partnership Project; Technical Specification Group Radio Access Network; Evolved Universal Terrestrial Radio Access Network (E-UTRAN); M2 Application Protocol (M2AP),(Release 13); 89 pages, Jun. 2015; V13.0.0.
"Considerations of Measurement Issues in LAA", Huawei, HiSilicon, 3GPP TSG RAN WG2 Meeting #90, R2-152218, 7.1.2, 4 pages, May 25-29, 2015, Fukuoka, Japan.
"Considerations on RRM measurements for LAA-LTE", Qualcomm Incorporated, 3GPP TSG-RAN WG2 Meeting #90bis, R2-152708, 7.1.2, May 25-29, 2015; 6 pages, Fukuoka, Japan.
"RRM Measurements for LAA", Ericcson, 3GPP TSG-RAN WG2 #90, Tdoc R2-152480, 7.1.2, May 25-29, 2015, 6 pages, Fukuoka, Japan.
"RSSI Measurement in LAA", Huawei, HiSilicon, 3GPP TSG-RAN WG2 Meeting #91, R2-153312, 7.1.2, Aug. 24-28, 2015, 5 pages, Beijing, China.
3GPP TR 36.889 V13.0.0, 3rd Generation Partnership Project; Technical Specification Group Radio Access Network; Study on Licensed-Assisted Access to Unlicensed Spectrum; (Release 13), Jun. 2015, 88 pages.
"Considerations on RRM measurements for LAA-LTE," TSG-RAN WG2 Meeting #90bis, R2-152708, Qualcomm Incorporated, May 25-29, 2015, 6 pages, Fukuoka, Japan.
"RSSI measurements and reporting," 3GPP TSG RAN WG2 #91, R2-153217, CMCC, Aug. 24-28, 2015, 8 pages, Beijing, China.

* cited by examiner

METHOD OF REPORTING RSSI MEASUREMENTS IN AN UNLICENSED BAND AND RELATED APPARATUS

CROSS-REFERENCE TO RELATED APPLICATIONS

This application is a continuation of International Application No. PCT/CN2015/087112, filed on Aug. 14, 2015, the disclosure of which is hereby incorporated by reference in its entirety.

TECHNICAL FIELD

The present application relates to the field of communications technologies, and in particular, to a signal processing method and a related device.

BACKGROUND

Development of mobile communications technologies and an increasing quantity of user equipments are accompanied with increasingly high load on limited licensed frequencies of mobile communications networks. To alleviate load on a licensed frequency, an unlicensed frequency may be used to provide a service such as data for user equipments. The unlicensed frequency is a type of frequency that can be directly used in conformity with relevant regulations of a department such as a government without a license. When an unlicensed frequency is used, listening needs to be performed before a signal is sent. That is, a signal can be transmitted on the unlicensed frequency only when it is detected through listening that the unlicensed frequency is idle. More user equipments using a frequency bring higher load on the frequency and a shorter time for which the frequency can be used by each user equipment. A base station may select a frequency that has relatively low load and that is relatively idle from unlicensed frequencies as far as possible, to provide a communications service for user equipments. A received signal strength indicator (RSSI) may be used to indicate total signal strength on a frequency. A larger RSSI value indicates that load on the frequency is higher, and a smaller RSSI value indicates that the load on the frequency is lower and the frequency is relatively idle. Therefore, the base station may select, by detecting an RSSI value of a signal on each candidate unlicensed frequency, an unlicensed frequency that has relatively low load and that is relatively idle, and provide a communications service for user equipments on the selected unlicensed frequency.

However, when the base station detects the RSSI value of the signal on the unlicensed frequency, the base station may detect only a signal that is sent on the unlicensed frequency by a neighboring base station that is relatively close to the base station. The base station may fail to detect a signal that is sent by a hidden base station that is relatively far from the base station but is relatively close to a user equipment served by the base station. When the base station selects an unlicensed frequency according to the RSSI value obtained through detection, the RSSI value may be less than an actual value. Consequently, the selected unlicensed frequency may be not idle. Therefore, when the user equipment uses such unlicensed frequency selected by the base station to perform communication, the user equipment is likely to be interfered by the hidden base station. Therefore, how to improve accuracy of the RSSI value according to which the base station serving the user equipment selects an idle unlicensed frequency is a problem urgently to be solved.

SUMMARY

Embodiments of the present application disclose a signal processing method and a related device, so as to improve accuracy of an RSSI value according to which a base station serving a user equipment selects an idle unlicensed frequency.

A first aspect of the embodiments of the present application discloses a signal processing method. The method includes obtaining, by a user equipment, configuration information used to detect a received signal strength indicator (RSSI) value of a signal on an unlicensed frequency, where the configuration information includes sampling parameter information and at least one statistical window that are of the signal on the unlicensed frequency, the sampling parameter information includes a sampling interval, and the at least one statistical window is a time length in which statistics on RSSI values of the signal on the unlicensed frequency at sampling moments are determined. The method further includes sampling, by the user equipment, the signal on the unlicensed frequency at the sampling interval, and obtaining the RSSI values of the signal on the unlicensed frequency at the sampling moments. The method also includes determining, by the user equipment, statistics on the RSSI values of the signal on the unlicensed frequency at the sampling moments included in the at least one statistical window, and obtaining an RSSI value statistical result of the signal on the unlicensed frequency, and reporting, by the user equipment, the RSSI value statistical result of the signal on the unlicensed frequency to a base station.

With reference to an implementation of the first aspect of the embodiments of the present application, in a first possible implementation of the first aspect of the embodiments of the present application, the configuration information further includes a reporting condition and the reporting condition indicates single reporting, and the reporting, by the user equipment, the RSSI value statistical result of the signal on the unlicensed frequency to the base station includes: reporting, by the user equipment to the base station, an RSSI value statistical result of the signal on the unlicensed frequency that corresponds to a single statistical window of the at least one statistical window; and after the reporting, by the user equipment to the base station, an RSSI value statistical result of the signal on the unlicensed frequency that corresponds to a single statistical window of the at least one statistical window, the method further includes controlling, by the user equipment, to stop sampling the signal on the unlicensed frequency at the sampling interval.

With reference to the implementation of the first aspect of the embodiments of the present application, in a second possible implementation of the first aspect of the embodiments of the present application, the configuration information further includes a reporting condition and the reporting condition indicates reporting according to a preset reporting period, and the reporting, by the user equipment, the RSSI value statistical result of the signal on the unlicensed frequency to the base station includes: determining, by the user equipment, a quantity of statistical windows included in the preset reporting period; and reporting, by the user equipment to the base station, an RSSI value statistical result of the signal on the unlicensed frequency that corresponds to the quantity of statistical windows of the at least one statistical window.

With reference to the implementation of the first aspect of the embodiments of the present application, in a third possible implementation of the first aspect of the embodiments of the present application, the configuration information further includes a reporting condition and the reporting condition is reporting according to a preset event, and the method further includes: determining, by the user equipment, whether the RSSI value statistical result includes information indicating the preset event; and if the information indicating the preset event is included, performing, by the user equipment, the reporting the RSSI value statistical result of the signal on the unlicensed frequency to the base station.

With reference to any one of the first aspect of the embodiments of the present application, or the first to the third possible implementations of the first aspect of the embodiments of the present application, in a fourth possible implementation of the first aspect of the embodiments of the present application, the configuration information further includes at least one RSSI threshold, and the determining, by the user equipment, statistics on the RSSI values of the signal on the unlicensed frequency at the sampling moments according to the at least one statistical window, and obtaining an RSSI value statistical result of the signal on the unlicensed frequency includes: dividing, by the user equipment, for each of the at least one statistical window according to the at least one RSSI threshold, RSSI values of the signal on the unlicensed frequency at sampling moments included in the statistical window into at least one RSSI value range; and obtaining a ratio of a quantity of RSSI values at sampling moments that are included in the at least one RSSI value range to a total quantity of the RSSI values of the signal on the unlicensed frequency at the sampling moments included in the statistical window, and using the ratio of the at least one RSSI value range as a statistical result.

With reference to the fourth possible implementation of the first aspect of the embodiments of the present application, in a fifth possible implementation of the first aspect of the embodiments of the present application, the RSSI value statistical result of the signal on the unlicensed frequency further includes at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information includes wireless local area network (WLAN) configuration information or cell configuration information.

With reference to any one of the first aspect of the embodiments of the present application, or the first to the fifth possible implementations of the first aspect of the embodiments of the present application, in a sixth possible implementation of the first aspect of the embodiments of the present application, the sampling parameter information further includes a sampling window and a sampling window period that correspond to the unlicensed frequency, the sampling window is used to indicate a time length in which the signal on the unlicensed frequency is sampled in each sampling window period, and a time length of the sampling interval is less than the time length of the sampling window, and the sampling, by the user equipment, the signal on the unlicensed frequency at the sampling interval, and obtaining the RSSI values of the signal on the unlicensed frequency at the sampling moments includes: sampling, by the user equipment, for the signal on the unlicensed frequency, the signal on the unlicensed frequency at the sampling interval according to the time length of the sampling window and the sampling window period, and obtaining the RSSI values of the signal on the unlicensed frequency at the sampling moments.

With reference to any one of the first aspect of the embodiments of the present application, or the first to the fifth possible implementations of the first aspect of the embodiments of the present application, in a seventh possible implementation of the first aspect of the embodiments of the present application, the sampling parameter information further includes a measurement time length and a measurement period, and the sampling, by the user equipment, the signal on the unlicensed frequency at the sampling interval, and obtaining the RSSI values of the signal on the unlicensed frequency at the sampling moments includes: sampling, by the user equipment, for the signal on the unlicensed frequency, the signal on the unlicensed frequency at the sampling interval according to the measurement time length and the measurement period, and obtaining the RSSI values of the signal on the unlicensed frequency at the sampling moments.

With reference to any one of the first aspect of the embodiments of the present application, or the first to the seventh possible implementations of the first aspect of the embodiments of the present application, in an eighth possible implementation of the first aspect of the embodiments of the present application, any one of the statistical window, the sampling parameter information, or the reporting condition that is included in the configuration information is preset by the user equipment or obtained from the base station serving the user equipment.

With reference to any one of the first aspect of the embodiments of the present application, or the first to the eighth possible implementations of the first aspect of the embodiments of the present application, in a ninth possible implementation of the first aspect of the embodiments of the present application, the user equipment includes a physical layer and a radio resource control layer, where the physical layer samples the signal on the unlicensed frequency at the sampling interval, obtains the RSSI values of the signal on the unlicensed frequency at the sampling moments, and sends the RSSI values of the signal on the unlicensed frequency at the sampling moments to the radio resource control layer, and the radio resource control layer determines statistics on the RSSI values of the signal on the unlicensed frequency at the sampling moments according to the at least one statistical window, and obtains the RSSI value statistical result of the signal on the unlicensed frequency; or, the physical layer samples the signal on the unlicensed frequency at the sampling interval, obtains the RSSI values of the signal on the unlicensed frequency at the sampling moments, determines statistics on the RSSI values of the signal on the unlicensed frequency at the sampling moments according to the at least one statistical window, obtains the RSSI value statistical result of the signal on the unlicensed frequency, and sends the RSSI value statistical result of the signal on the unlicensed frequency to the radio resource control layer.

With reference to any one of the first aspect of the embodiments of the present application, or the first to the ninth possible implementations of the first aspect of the embodiments of the present application, in a tenth possible implementation of the first aspect of the embodiments of the present application, the configuration information further includes frequency indication information, and the user equipment determines, according to the frequency indication information, the unlicensed frequency on which the RSSI value statistical result of the signal needs to be obtained.

A second aspect of the embodiments of the present application discloses a signal processing method. The method includes sending, by a base station to a user equipment, configuration information used to detect a received signal strength indicator (RSSI) value of a signal on an unlicensed frequency, where the configuration information includes frequency indication information, and the user equipment determines, according to the frequency indication information, the unlicensed frequency on which an RSSI value statistical result of the signal needs to be obtained. The method further includes receiving, by the base station, the RSSI value statistical result of the signal on the unlicensed frequency that is obtained by the user equipment according to the configuration information; and determining, by the base station according to the RSSI value statistical result of the signal on the unlicensed frequency, whether the unlicensed frequency is an idle unlicensed frequency used for communication with the user equipment.

With reference to an implementation of the second aspect of the embodiments of the present application, in a first possible implementation of the second aspect of the embodiments of the present application, the configuration information includes sampling parameter information and/or at least one statistical window that are/is used to sample the signal on the unlicensed frequency, the sampling parameter information includes a sampling interval, and the at least one statistical window is a time length in which statistics on RSSI values of the signal on the unlicensed frequency at sampling moments are determined.

With reference to the second aspect of the embodiments of the present application or the first possible implementation of the second aspect of the embodiments of the present application, in a second possible implementation of the second aspect of the embodiments of the present application, the configuration information further includes a reporting condition used to trigger the user equipment to report the RSSI value statistical result of the signal on the unlicensed frequency, and the reporting condition includes any one of performing single reporting of an RSSI value statistical result of the signal on the unlicensed frequency that corresponds to a single statistical window of the at least one statistical window, performing periodical reporting according to a preset reporting period, or performing event-based reporting according to information that indicates a preset event and that is included in the RSSI value statistical result of the signal on the unlicensed frequency.

With reference to the second aspect of the embodiments of the present application, or the first or the second possible implementation of the second aspect of the embodiments of the present application, in a third possible implementation of the second aspect of the embodiments of the present application, the configuration information further includes at least one RSSI threshold, and the at least one RSSI threshold is used to divide, for each of the at least one statistical window, RSSI values of the signal on the unlicensed frequency at sampling moments included in the statistical window into at least one RSSI value range, and a ratio of a quantity of RSSI values at sampling moments that are included in the at least one RSSI value range to a total quantity of the RSSI values of the signal on the unlicensed frequency at the sampling moments included in the statistical window is used as the RSSI value statistical result of the signal on the unlicensed frequency.

With reference to the third possible implementation of the second aspect of the embodiments of the present application, in a fourth possible implementation of the second aspect of the embodiments of the present application, the RSSI value statistical result of the signal on the unlicensed frequency further includes at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information includes wireless local area network (WLAN) information or cell configuration information.

With reference to any one of the second aspect of the embodiments of the present application, or the first to the fourth possible implementations of the second aspect of the embodiments of the present application, in a fifth possible implementation of the second aspect of the embodiments of the present application, the sampling parameter information further includes a sampling window and a sampling window period that correspond to the unlicensed frequency, the sampling window is used to indicate a time length in which the signal on the unlicensed frequency is sampled in each sampling window period, and a time length of the sampling interval is less than the time length of the sampling window.

With reference to any one of the second aspect of the embodiments of the present application, or the first to the fourth possible implementations of the second aspect of the embodiments of the present application, in a sixth possible implementation of the second aspect of the embodiments of the present application, the sampling parameter information further includes a measurement time length and a measurement period, the measurement time length is used to indicate a time length in which the signal on the unlicensed frequency is sampled in each measurement period, and a time length of the sampling interval is less than the time length of the measurement time length.

A third aspect of the embodiments of the present application discloses user equipment. The user equipment includes an obtaining module, configured to obtain configuration information used to detect a received signal strength indicator (RSSI) value of a signal on an unlicensed frequency, where the configuration information includes sampling parameter information and at least one statistical window that are of the signal on the unlicensed frequency, the sampling parameter information includes a sampling interval, and the at least one statistical window is a time length in which statistics on RSSI values of the signal on the unlicensed frequency at sampling moments are determined. The user equipment further includes a sampling module, configured to sample the signal on the unlicensed frequency at the sampling interval, and obtain the RSSI values of the signal on the unlicensed frequency at the sampling moments. The user equipment further includes a statistics determining module, configured to determine statistics on the RSSI values of the signal on the unlicensed frequency at the sampling moments included in the at least one statistical window, and obtain an RSSI value statistical result of the signal on the unlicensed frequency. The user equipment also includes a reporting module, configured to report the RSSI value statistical result of the signal on the unlicensed frequency to the base station.

With reference to an implementation of the third aspect of the embodiments of the present application, in a first possible implementation of the third aspect of the embodiments of the present application, the configuration information further includes a reporting condition and the reporting condition indicates single reporting, and the reporting module is specifically configured to report, to the base station, an RSSI value statistical result of the signal on the unlicensed frequency that corresponds to a single statistical window of the at least one statistical window. The user equipment further includes a control module, configured to: after the reporting module reports, to the base station, the RSSI value statistical result of the signal on the unlicensed frequency that corresponds to the single statistical window of the at least one statistical window, control to stop sampling the signal on the unlicensed frequency at the sampling interval.

With reference to the third aspect of the embodiments of the present application or the first possible implementation of the third aspect of the embodiments of the present application, in a second possible implementation of the third aspect of the embodiments of the present application, the configuration information further includes a reporting condition and the reporting condition indicates reporting according to a preset reporting period, and the reporting module includes: a determining unit, configured to determine a quantity of statistical windows included in the preset reporting period; and a reporting unit, configured to report, to the base station, an RSSI value statistical result of the signal on the unlicensed frequency that corresponds to the quantity of statistical windows of the at least one statistical window.

With reference to the third aspect of the embodiments of the present application, or the first or the second possible implementation of the third aspect of the embodiments of the present application, in a third possible implementation of the third aspect of the embodiments of the present application, the configuration information further includes a reporting condition and the reporting condition is reporting according to a preset event, and the user equipment further includes: a judging module, configured to: determine whether the RSSI value statistical result includes information indicating the preset event; and if it is determined that the information indicating the preset event is included, trigger the reporting module to perform the operation of reporting the RSSI value statistical result of the signal on the unlicensed frequency to the base station.

With reference to the third possible implementation of the third aspect of the embodiments of the present application, in a fourth possible implementation of the third aspect of the embodiments of the present application, the configuration information further includes at least one RSSI threshold, and the statistics determining module is specifically configured to: divide, for each of the at least one statistical window according to the at least one RSSI threshold, RSSI values of the signal on the unlicensed frequency at sampling moments included in the statistical window into at least one RSSI value range; and obtain a ratio of a quantity of RSSI values at sampling moments that are included in the at least one RSSI value range to a total quantity of the RSSI values of the signal on the unlicensed frequency at the sampling moments included in the statistical window, and use the ratio of the at least one RSSI value range as a statistical result.

With reference to any one of the third aspect of the embodiments of the present application, or the first to the fourth possible implementations of the third aspect of the embodiments of the present application, in a fifth possible implementation of the third aspect of the embodiments of the present application, the RSSI value statistical result of the signal on the unlicensed frequency further includes at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information includes wireless local area network (WLAN) configuration information or cell configuration information.

With reference to any one of the third aspect of the embodiments of the present application, or the first to the fifth possible implementations of the third aspect of the embodiments of the present application, in a sixth possible implementation of the third aspect of the embodiments of the present application, the sampling parameter information further includes a sampling window and a sampling window period that correspond to the unlicensed frequency, the sampling window is used to indicate a time length in which the signal on the unlicensed frequency is sampled in each sampling window period, and a time length of the sampling interval is less than the time length of the sampling window, and the sampling module is specifically configured to: sample, for the signal on the unlicensed frequency, the signal on the unlicensed frequency at the sampling interval according to the time length of the sampling window and the sampling window period, and obtain the RSSI values of the signal on the unlicensed frequency at the sampling moments.

With reference to any one of the third aspect of the embodiments of the present application, or the first to the fifth possible implementations of the third aspect of the embodiments of the present application, in a seventh possible implementation of the third aspect of the embodiments of the present application, the sampling parameter information further includes a measurement time length and a measurement period, and the sampling module is specifically configured to: sample, for the signal on the unlicensed frequency, the signal on the unlicensed frequency at the sampling interval according to the measurement time length and the measurement period, and obtain the RSSI values of the signal on the unlicensed frequency at the sampling moments.

With reference to any one of the third aspect of the embodiments of the present application, or the first to the seventh possible implementations of the third aspect of the embodiments of the present application, in an eighth possible implementation of the third aspect of the embodiments of the present application, any one of the statistical window, the sampling parameter information, or the reporting condition that is included in the configuration information is preset by the user equipment or obtained from the base station serving the user equipment.

With reference to any one of the third aspect of the embodiments of the present application, or the first to the eighth possible implementations of the third aspect of the embodiments of the present application, in a ninth possible implementation of the third aspect of the embodiments of the present application, the user equipment includes a physical layer and a radio resource control layer, where the physical layer samples the signal on the unlicensed frequency at the sampling interval, obtains the RSSI values of the signal on the unlicensed frequency at the sampling moments, and sends the RSSI values of the signal on the unlicensed frequency at the sampling moments to the radio resource control layer, and the radio resource control layer determines statistics on the RSSI values of the signal on the unlicensed frequency at the sampling moments according to the at least one statistical window, and obtains the RSSI value statistical result of the signal on the unlicensed frequency; or, the physical layer samples the signal on the unlicensed frequency at the sampling interval, obtains the RSSI values of the signal on the unlicensed frequency at the sampling moments, determines statistics on the RSSI values of the signal on the unlicensed frequency at the sampling moments according to the at least one statistical window, obtains the RSSI value statistical result of the signal on the unlicensed frequency, and sends the RSSI value statistical result of the signal on the unlicensed frequency to the radio resource control layer.

With reference to any one of the third aspect of the embodiments of the present application, or the first to the ninth possible implementations of the third aspect of the embodiments of the present application, in a tenth possible implementation of the third aspect of the embodiments of the present application, the configuration information further includes frequency indication information, and the user equipment determines, according to the frequency indication information, the unlicensed frequency on which the RSSI value statistical result of the signal needs to be obtained.

A fourth aspect of the embodiments of the present application discloses a base station. The base station includes a communications module, configured to send, to a user equipment, configuration information used to detect a received signal strength indicator (RSSI) value of a signal on an unlicensed frequency, where the configuration information includes frequency indication information, and the user equipment determines, according to the frequency indication information, the unlicensed frequency on which an RSSI value statistical result of the signal needs to be obtained. The communications module is further configured to receive the RSSI value statistical result of the signal on the unlicensed frequency that is obtained by the user equipment according to the configuration information. The base station further includes a judging module, configured to determine, according to the RSSI value statistical result of the signal on the unlicensed frequency received by the communications module, whether the unlicensed frequency is an idle unlicensed frequency used for communication with the user equipment.

With reference to an implementation of the fourth aspect of the embodiments of the present application, in a first possible implementation of the fourth aspect of the embodiments of the present application, the configuration information includes sampling parameter information and/or at least one statistical window that are/is used to sample the signal on the unlicensed frequency, the sampling parameter information includes a sampling interval, and the at least one statistical window is a time length in which statistics on RSSI values of the signal on the unlicensed frequency at sampling moments are determined.

With reference to the fourth aspect of the embodiments of the present application or the first possible implementation of the fourth aspect of the embodiments of the present application, in a second possible implementation of the fourth aspect of the embodiments of the present application, the configuration information further includes a reporting condition used to trigger the user equipment to report the RSSI value statistical result of the signal on the unlicensed frequency, and the reporting condition includes any one of performing single reporting of an RSSI value statistical result of the signal on the unlicensed frequency that corresponds to a single statistical window of the at least one statistical window, performing periodical reporting according to a preset reporting period, or performing event-based reporting according to information that indicates a preset event and that is included in the RSSI value statistical result of the signal on the unlicensed frequency.

With reference to the fourth aspect of the embodiments of the present application, or the first or the second possible implementation of the fourth aspect of the embodiments of the present application, in a third possible implementation of the fourth aspect of the embodiments of the present application, the configuration information further includes at least one RSSI threshold, and the at least one RSSI threshold is used to divide, for each of the at least one statistical window, RSSI values of the signal on the unlicensed frequency at sampling moments included in the statistical window into at least one RSSI value range, and a ratio of a quantity of RSSI values at sampling moments that are included in the at least one RSSI value range to a total quantity of the RSSI values of the signal on the unlicensed frequency at the sampling moments included in the statistical window is used as the RSSI value statistical result of the signal on the unlicensed frequency.

With reference to the fourth aspect of the embodiments of the present application, or the third possible implementation of the fourth aspect of the embodiments of the present application, in a fourth possible implementation of the fourth aspect of the embodiments of the present application, the RSSI value statistical result of the signal on the unlicensed frequency further includes at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information includes wireless local area network WLAN information or cell configuration information.

With reference to any one of the fourth aspect of the embodiments of the present application, or the first to the fourth possible implementations of the fourth aspect of the embodiments of the present application, in a fifth possible implementation of the fourth aspect of the embodiments of the present application, the sampling parameter information further includes a sampling window and a sampling window period that correspond to the unlicensed frequency, the sampling window is used to indicate a time length in which the signal on the unlicensed frequency is sampled in each sampling window period, and a time length of the sampling interval is less than the time length of the sampling window.

With reference to any one of the fourth aspect of the embodiments of the present application, or the first to the fourth possible implementations of the fourth aspect of the embodiments of the present application, in a fifth possible implementation of the fourth aspect of the embodiments of the present application, the sampling parameter information further includes a measurement time length and a measurement period, the measurement time length is used to indicate a time length in which the signal on the unlicensed frequency is sampled in each measurement period, and a time length of the sampling interval is less than the time length of the measurement time length.

In the embodiments of the present application, a user equipment may obtain configuration information used to detect a received signal strength indicator (RSSI) value of a signal on an unlicensed frequency, sample the signal on the unlicensed frequency according to a sampling interval in the configuration information, obtain RSSI values of the signal on the unlicensed frequency at sampling moments, determine statistics on RSSI values of the signal on the unlicensed frequency at sampling moments included in at least one statistical window in the configuration information, and obtain an RSSI value statistical result of the signal on the unlicensed frequency and report the RSSI value statistical result to a base station. The user equipment samples the signal on the unlicensed frequency, and can obtain all signals using the unlicensed frequency within a particular range from the user equipment, thereby avoiding interference of a hidden base station to the user equipment when the user equipment uses a selected idle unlicensed frequency. Further, in the embodiments of the present application, RSSI values of the signal on the unlicensed frequency at multiple sampling moments are obtained, and statistics on the RSSI values of the signal on the unlicensed frequency at the multiple sampling moments are determined to obtain the RSSI value statistical result of the signal on the unlicensed frequency, thereby further improving accuracy of an RSSI value according to which the base station serving the user equipment selects an idle unlicensed frequency

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
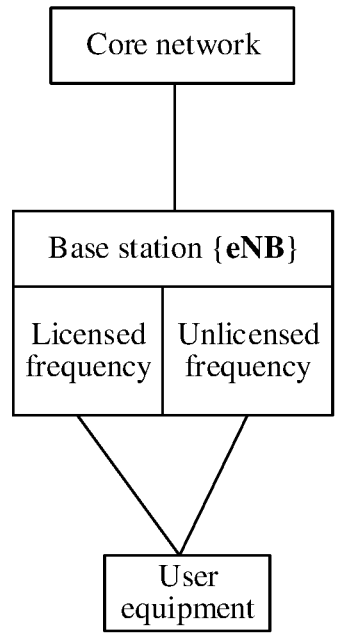
FIG. 1 is a schematic diagram of a system architecture according to an embodiment of the present application.
Figure 2:
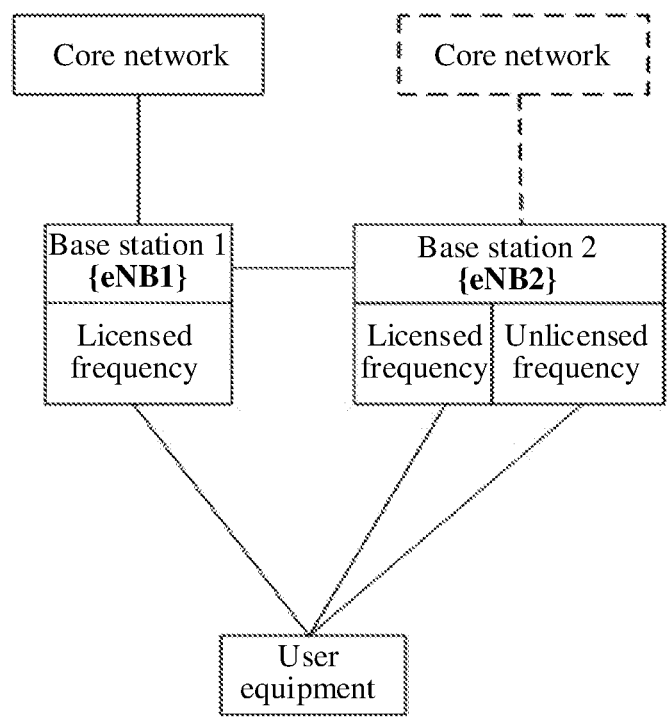
FIG. 2 is a schematic diagram of another system architecture according to an embodiment of the present application.
Figure 3:
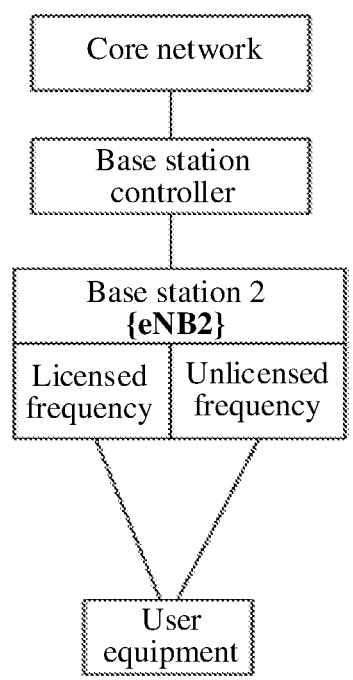
FIG. 3 is a schematic diagram of yet another system architecture according to an embodiment of the present application.

Referring to FIG. 1 to FIG. 3, each of FIG. 1 to FIG. 3 is a schematic diagram of a system architecture according to an embodiment of the present application. A signal processing method disclosed in an embodiment of the present application is applicable to, but not limited to, the foregoing three system architectures. As shown in FIG. 1, a single user equipment is connected to a core network using a single base station. The base station includes two carriers; and one is a licensed carrier corresponding to a licensed frequency, and the other is an unlicensed carrier corresponding to an unlicensed frequency. As shown in FIG. 2, a single user equipment is connected to a core network using multiple base stations. One of the base stations may include two carriers; and similarly, one is a licensed carrier corresponding to a licensed frequency, and the other is an unlicensed carrier corresponding to an unlicensed frequency. As shown in FIG. 3, a single user equipment may first be connected to a base station using a carrier, and then the base station is connected to a base station controller, and the single user equipment is connected to a core network using the base station controller. Similarly, the base station may include two carriers; and similarly, one is a licensed carrier corresponding to a licensed frequency, and the other is an unlicensed carrier corresponding to an unlicensed frequency. For the unlicensed frequency in FIG. 1 to FIG. 3, in the signal processing method disclosed in the embodiment of the present application, an RSSI value statistical result of a signal on the unlicensed frequency may be obtained, so that the base station selects an idle unlicensed frequency as a carrier for information exchange between the user equipment and the base station. The signal processing method can improve accuracy of an RSSI value according to which the base station serving the user equipment selects the idle unlicensed frequency. Detailed descriptions are separately provided below.

Figure 4:
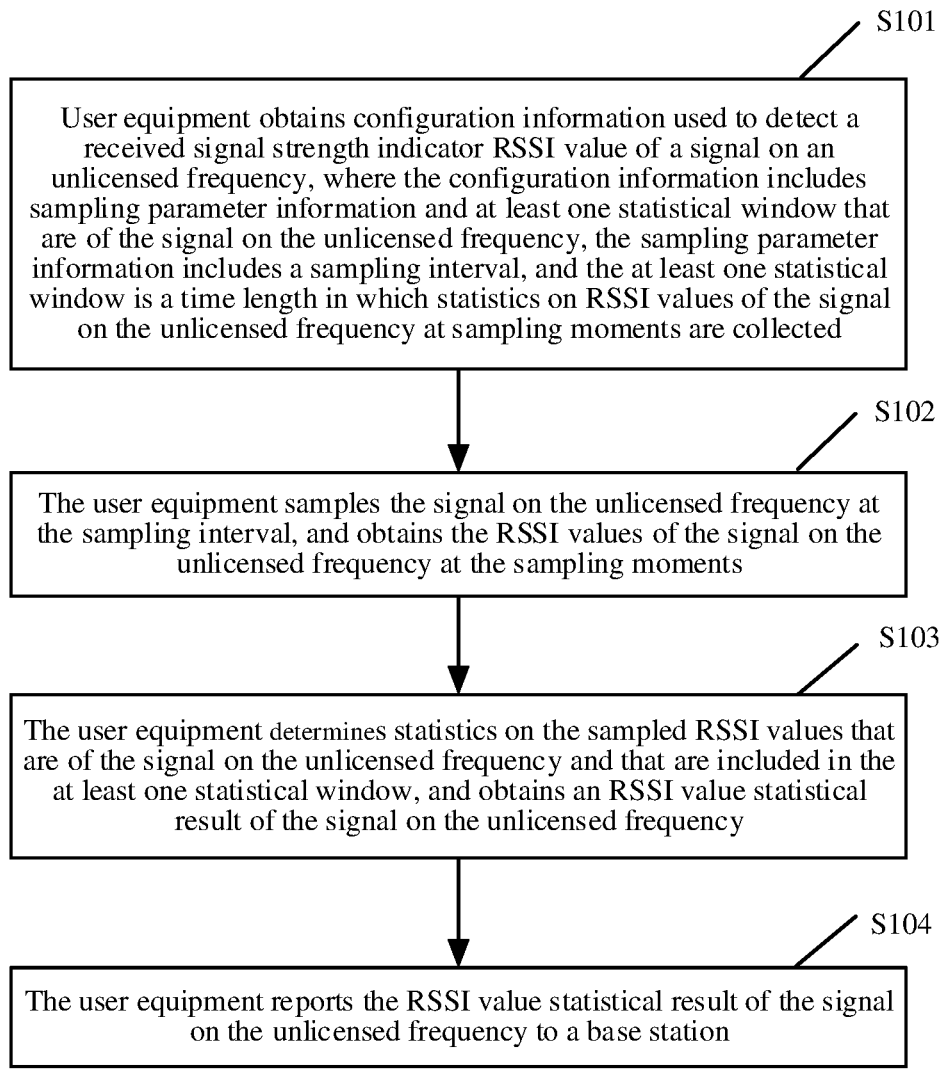
FIG. 4 is a schematic flowchart of a signal processing method according to an embodiment of the present application.

Referring to FIG. 4, FIG. 4 is a schematic flowchart of a signal processing method according to an embodiment of the present application. The signal processing method shown in FIG. 4 is described from the perspective of a user equipment. As shown in FIG. 4, the signal processing method may include the following steps.

S101. The user equipment obtains configuration information used to detect a received signal strength indicator (RSSI) value of a signal on an unlicensed frequency, where the configuration information includes sampling parameter information and at least one statistical window that are of the signal on the unlicensed frequency, the sampling parameter information includes a sampling interval, and the at least one statistical window is a time length in which statistics on RSSI values of the signal on the unlicensed frequency at sampling moments are determined.

In this embodiment of the present application, the sampling parameter information and the statistical window in the configuration information used to detect the received signal strength indicator (RSSI) value of the signal on the unlicensed frequency may be received from a base station, or may be preset by the user equipment. A manner of receiving the configuration information from the base station may be setting the configuration information by the base station according to a power consumption requirement or a requirement for accuracy of selecting an idle unlicensed frequency. A manner of directly obtaining the configuration information from the user equipment can reduce communications resources, signaling overheads, or the like between the user equipment and the base station. The configuration information may include multiple different unlicensed frequencies. The unlicensed frequencies may correspond to different sampling parameter information, or may correspond to the same sampling parameter information. This is not limited in this embodiment of the present application.

Specifically, the sampling interval indicates a time interval between every two times of sampling. For example, the sampling interval may be one subframe or one symbol, indicating that sampling is performed once in each subframe or each symbol. Further, each time of sampling includes sampling duration that indicates a measurement time length of each time of sampling by the user equipment. If the sampling duration is equal to the sampling interval, it indicates that the user equipment performs continuous sampling. The sampling duration may be a predefined time length, or a time length configured by the base station.

S102. The user equipment samples the signal on the unlicensed frequency at the sampling interval, and obtains the RSSI values of the signal on the unlicensed frequency at the sampling moments.

Figure 5A:
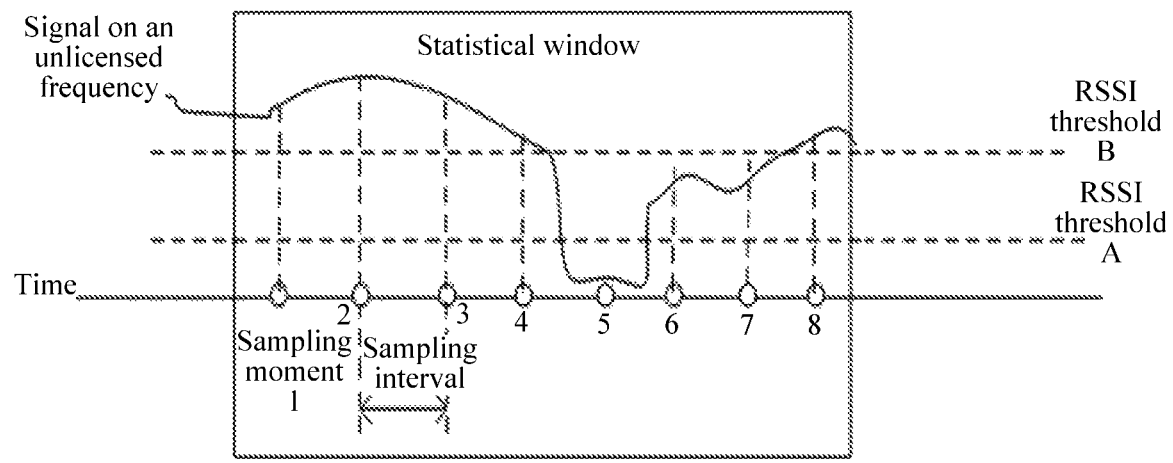
FIG. 5a is a schematic diagram of sampling of a signal on an unlicensed frequency according to the embodiment of the present application.

In this embodiment of the present application, referring to FIG. 5a, FIG. 5a is a schematic diagram of sampling of a signal on an unlicensed frequency according to an embodiment of the present application. As shown in FIG. 5a, the user equipment samples the signal on the unlicensed frequency at the sampling interval, and obtains RSSI values of the signal on the unlicensed frequency at the sampling moments. The RSSI values at the sampling moments indicate idle degrees of the unlicensed frequency at the sampling moments, and a smaller RSSI value indicates that the unlicensed frequency is idler at a sampling moment.

In another optional implementation, the sampling parameter information further includes a measurement time length and a measurement period, and sampling, by the user equipment, the signal on the unlicensed frequency at the sampling interval, and obtaining the RSSI values of the signal on the unlicensed frequency at the sampling moments includes: sampling, for the signal on the unlicensed frequency, the signal on the unlicensed frequency at the sampling interval according to the measurement time length and the measurement period, and obtaining the RSSI values of the signal on the unlicensed frequency at the sampling moments.

S103. The user equipment determines statistics on the sampled RSSI values that are of the signal on the unlicensed frequency and that are included in the at least one statistical window, and obtains an RSSI value statistical result of the signal on the unlicensed frequency.

In this embodiment of the present application, as shown in FIG. 5a, the user equipment determines statistics on the RSSI values of the signal on the unlicensed frequency at the sampling moments using a time length corresponding to the statistical window as a unit, and obtains an RSSI value statistical result of the signal on the unlicensed frequency. The RSSI value statistical result of the signal on the unlicensed frequency may include RSSI value statistical results of the signal on the unlicensed frequency that correspond to multiple statistical windows.

In this embodiment of the present application, the configuration information may further include at least one RSSI threshold. Correspondingly, in step S103, determining, by the user equipment, statistics on the sampled RSSI values that are of the signal on the unlicensed frequency and that are included in the at least one statistical window, and obtaining an RSSI value statistical result of the signal on the unlicensed frequency may include: dividing, for each of the at least one statistical window according to the at least one RSSI threshold, RSSI values of the signal on the unlicensed frequency at sampling moments that correspond to the statistical window into at least one RSSI value range; and obtaining a ratio of a quantity of RSSI values included in the at least one RSSI value range of the signal on the unlicensed frequency to a total quantity of the RSSI values at the sampling moments in the statistical window, and using the ratio of the at least one RSSI value range of the signal on the unlicensed frequency as a statistical result.

For example, a quantity of RSSI values at sampling moments that are included in one statistical window may be determined according to a time length of the statistical window and a time length of the sampling interval. It is set that the configuration information includes one RSSI threshold that is an RSSI threshold A. As shown in FIG. 5a, a single statistical window may include RSSI values at eight sampling moments. That is, an RSSI value statistical result of the signal on the unlicensed frequency that corresponds to the single statistical window may include the eight RSSI values, an average RSSI value of the eight RSSI values, and a ratio of a quantity of RSSI values greater than the RSSI threshold A to a quantity of the eight RSSI values, and/or a ratio of a quantity of RSSI values less than the preset RSSI threshold A to a quantity of the eight RSSI values. Correspondingly, as shown in FIG. 5a, the configuration information further includes another RSSI threshold B. The RSSI values of the signal on the unlicensed frequency at the sampling moments that correspond to the statistical window may be divided into multiple ranges according to the RSSI threshold A and the RSSI threshold B. As shown in Table 1, an RSSI value less than the RSSI threshold A is an RSSI value R5 at a sampling moment 5, and a ratio is 1/8. RSSI values greater than the RSSI threshold A and less than the RSSI threshold B are RSSI values R6 and R7 at sampling moments 6 and 7, and a ratio is 1/4. RSSI values greater than the RSSI threshold B are RSSI values R1, R2, R3, R4, and R8 at sampling moments 1, 2, 3, 4, and 8, and a ratio is 5/8. In this case, the RSSI value statistical result of the signal on the unlicensed frequency that corresponds to the single statistical window may further include the RSSI values at the sampling moments that are included in the at least one RSSI value range and the ratio of the RSSI values at the sampling moments that are included in the at least one RSSI value range to the total quantity of the RSSI values at the sampling moments in the statistical window.

TABLE 1

| RSSI value range | Less than the RSSI threshold A | Greater than the RSSI threshold A and less than the RSSI threshold B | Greater than the RSSI threshold B |
|---|---|---|---|
| RSSI value included in each RSSI value range | R5 | R6, R7 | R2, R3, R4, R8 |
| Ratio of the RSSI value included in each RSSI value range | 1/8 | 1/4 | 5/8 |

In an optional implementation, the sampling parameter information in the configuration information may further include a sampling window and a sampling window period that correspond to the unlicensed frequency, the sampling window is used to indicate a time length in which the signal on the unlicensed frequency is sampled in each sampling window period, and the time length of the sampling interval is less than the time length of the sampling window. If signals on multiple unlicensed frequencies need to be sampled, a respective sampling window or sampling window period may be configured for each unlicensed frequency. Correspondingly, in step S102, sampling, by the user equipment, the signal on the unlicensed frequency at the sampling interval, and obtaining the RSSI values of the signal on the unlicensed frequency at the sampling moments may include: sampling, for the signal on the unlicensed frequency, the signal on the unlicensed frequency at the sampling interval according to the time length of the sampling window and the sampling window period, and obtaining the RSSI values of the signal on the unlicensed frequency at the sampling moments.

Correspondingly, in step S103, determining, by the user equipment, statistics on the RSSI values of the signal on the unlicensed frequency at the sampling moments included in the at least one statistical window, and obtaining the RSSI value statistical result of the signal on the unlicensed frequency may include: determining, by the user equipment according to the sampling window period, a quantity of at least one sampling window included in a single statistical window, determining statistics on sampled RSSI values included in each of the quantity of the at least one sampling window, obtaining an RSSI value statistical result of the signal on the unlicensed frequency that corresponds to the single statistical window, and obtaining an RSSI value statistical result of the signal on the unlicensed frequency that corresponds to the at least one statistical window and using the statistical result as the RSSI value statistical result of the signal on the unlicensed frequency. It should be noted that, in this embodiment of the present application, the multiple different unlicensed frequencies in the configuration information may correspond to different sampling windows and sampling window periods.

Figure 5B:
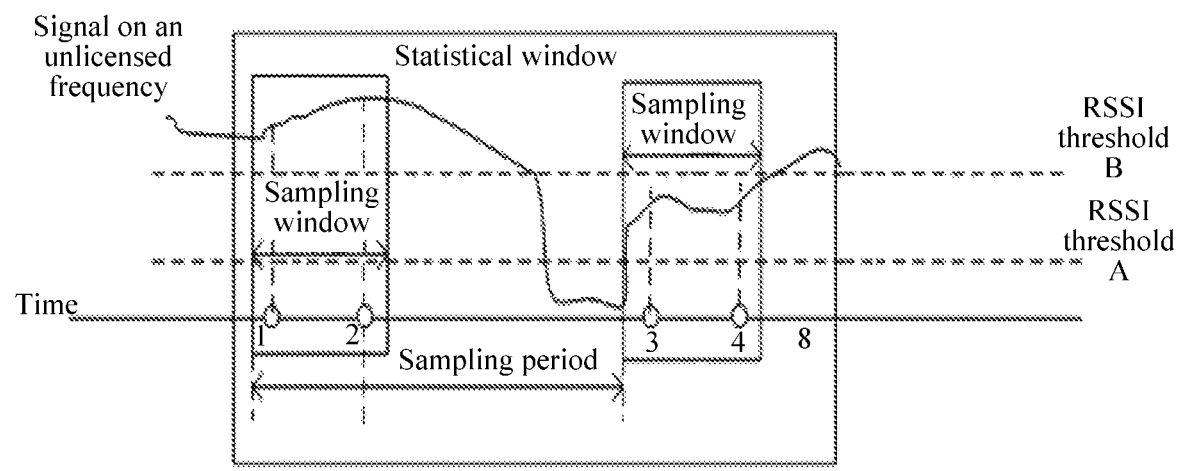
FIG. 5b is a schematic diagram of sampling of the signal on the unlicensed frequency according to the embodiment of the present application.

For example, as shown in FIG. 5b, a sampling window included in each sampling window period may include two sampling moments according to the time length of the sampling interval and one statistical window. The single statistical window on which statistics are determined may include two sampling windows. In this case, statistics on RSSI values of the signal on the unlicensed frequency at sampling moments included in the two sampling windows are determined, and an RSSI value statistical result of the signal on the unlicensed frequency is obtained. For example, the RSSI value statistical result of the signal on the unlicensed frequency may include the RSSI values R1, R2, R3, and R4 at the sampling moments 1, 2, 3, and 4, RSSI values at sampling moments in the statistical window that are greater than the RSSI threshold A and less than the RSSI threshold B are R3 and R4, RSSI values at sampling moments in the statistical window that are greater than the RSSI threshold B are R1 and R2, and each sampling window may be included in the statistical window.

In another optional implementation, a sampling time may be controlled by configuring the measurement time length and the measurement period. In addition, the configuration information further includes frequency indication information, and the user equipment determines, according to the frequency indication information, the unlicensed frequency on which the RSSI value statistical result of the signal needs to be obtained. Multiple unlicensed frequencies may be determined according to the frequency indication information. If the multiple unlicensed frequencies need to be measured, the multiple unlicensed frequencies are in turn measured in the sampling time controlled using the measurement time length and the measurement period. Correspondingly, in step S102, sampling, by the user equipment, the signal on the unlicensed frequency at the sampling interval, and obtaining the RSSI values of the signal on the unlicensed frequency at the sampling moments may include: sampling, for the signal on the unlicensed frequency, the signal on the unlicensed frequency in the measurement time length of the measurement period at the sampling interval according to the measurement time length and the measurement period, and obtaining the RSSI values of the signal on the unlicensed frequency at the sampling moments. If multiple unlicensed frequencies need to be measured, the measurement time length is used to sample signals on the multiple unlicensed frequencies in turn. For example, signals on different unlicensed frequencies may be sampled in measurement time lengths of different measurement periods at the sampling interval. Correspondingly, in step S103, determining statistics on the RSSI values of the signal on the unlicensed frequency at the sampling moments according to the statistical window, and obtaining the RSSI value statistical result of the signal on the unlicensed frequency may include: determining, for each of the at least one statistical window according to the measurement time length and the measurement period, at least one measurement time length included in the statistical window; and determining statistics on sampled RSSI values of the signal on the unlicensed frequency in each of the at least one measurement time length included in each statistical window, and obtaining the RSSI value statistical result of the signal on the unlicensed frequency.

Figure 5C:
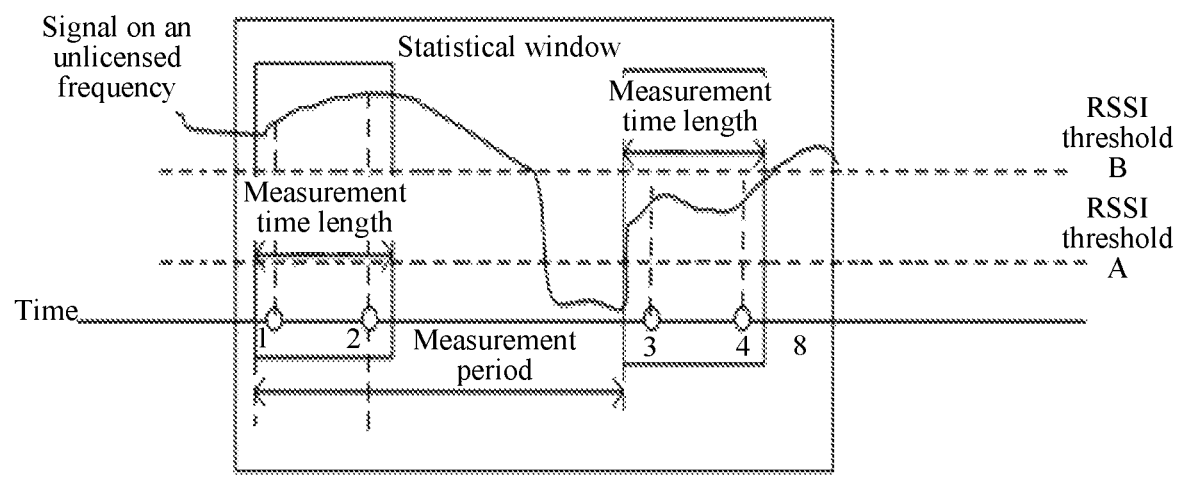
FIG. 5c is a schematic diagram of sampling of the signal on the unlicensed frequency according to the embodiment of the present application.

For example, as shown in FIG. 5c, a measurement time length included in each measurement period may include two sampling moments according to the time length of the sampling interval. Correspondingly, it may be determined according to a time length of a statistical window that one statistical window may include two measurement time lengths. Statistics on RSSI values of the signal on the unlicensed frequency at sampling moments included in the two measurement time lengths are determined, and an RSSI value statistical result of the signal on the unlicensed frequency is obtained. For example, in the two measurement time lengths included in the statistical window, sampled RSSI values included in the first measurement time length are both greater than the RSSI threshold B, and sampled RSSI values included in the second measurement time length are both less than the RSSI threshold B.

S104. The user equipment reports the RSSI value statistical result of the signal on the unlicensed frequency to a base station.

In this embodiment of the present application, the user equipment may separately report RSSI value statistical results of signals on unlicensed frequencies to the base station, or may report RSSI value statistical results of signals on multiple unlicensed frequencies to the base station at the same time, to trigger the base station to select, according to the RSSI value statistical results of the signals on the multiple unlicensed frequencies, an idle unlicensed frequency. This is not limited in this embodiment of the present application.

In this embodiment of the present application, the RSSI value statistical result of the signal on the unlicensed frequency may include at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information includes wireless local area network (WLAN) configuration information or cell configuration information.

In this embodiment of the present application, the user equipment has a physical layer and a radio resource control layer. The physical layer samples the signal on the unlicensed frequency at the sampling interval, obtains the RSSI values of the signal on the unlicensed frequency at the sampling moments, and sends the RSSI values of the signal on the unlicensed frequency at the sampling moments to the radio resource control layer, and the radio resource control layer determines statistics on the RSSI values of the signal on the unlicensed frequency at the sampling moments included in the at least one statistical window, and obtains the RSSI value statistical result of the signal on the unlicensed frequency. Alternatively, the physical layer samples the signal on the unlicensed frequency at the sampling interval, obtains the RSSI values of the signal on the unlicensed frequency at the sampling moments, determines statistics on the RSSI values of the signal on the unlicensed frequency at the sampling moments included in the at least one statistical window, obtains the RSSI value statistical result of the signal on the unlicensed frequency, and sends the RSSI value statistical result of the signal on the unlicensed frequency to the radio resource control layer. The radio resource control layer reports the RSSI value statistical result of the signal on the unlicensed frequency to the base station, to trigger the base station to select, according to the RSSI value statistical result of the signal on the unlicensed frequency, an idle unlicensed frequency.

In an optional implementation, if the configuration information further includes a reporting condition and the reporting condition is reporting according to a preset event, before performing step S104, the user equipment may further determine whether the RSSI value statistical result of the signal on the unlicensed frequency includes information indicating the preset event. If the RSSI value statistical result includes the information indicating the preset event, the user equipment performs step S104 to report the RSSI value statistical result of the signal on the unlicensed frequency to the base station, to trigger the base station to select, according to the RSSI value statistical result, an idle unlicensed frequency. In this implementation, the RSSI value statistical result of the signal on the unlicensed frequency may be reported to the base station when the RSSI value statistical result includes the information indicating the preset event, so that the base station can learn a current state of the unlicensed frequency in time, and select an idle unlicensed frequency according to the preset event more accurately.

In this embodiment of the present application, the information indicating the preset event may include information indicating that a ratio of a quantity of RSSI values at sampling moments in a single statistical window that are greater than or less than the RSSI threshold to a quantity of RSSI values at all sampling moments in the statistical window is greater than a preset ratio, or information indicating that the average value of the sampled RSSI values in the statistical window in the RSSI value statistical result corresponding to the unlicensed frequency is greater than or less than an RSSI value corresponding to a particular licensed frequency.

In the signal processing method described in FIG. 4, a user equipment may obtain configuration information used to detect a received signal strength indicator (RSSI) value of a signal on an unlicensed frequency, sample the signal on the unlicensed frequency according to a sampling interval in the configuration information, obtain RSSI values of the signal on the unlicensed frequency at sampling moments, determine statistics on RSSI values of the signal on the unlicensed frequency at sampling moments included in at least one statistical window in the configuration information, and obtain an RSSI value statistical result of the signal on the unlicensed frequency and report the RSSI value statistical result to a base station. It can be learnt that, in this embodiment of the present application, the user equipment samples the signal on the unlicensed frequency, and can obtain all signals using the unlicensed frequency within a particular range from the user equipment, thereby avoiding interference of a hidden base station to the user equipment when the user equipment uses a selected idle unlicensed frequency. Further, in this embodiment of the present application, RSSI values of the signal on the unlicensed frequency at multiple sampling moments are obtained, and statistics on the RSSI values of the signal on the unlicensed frequency at the multiple sampling moments are determined to obtain the RSSI value statistical result of the signal on the unlicensed frequency, thereby further improving accuracy of an RSSI value according to which the base station serving the user equipment selects an idle unlicensed frequency.

Figure 6:
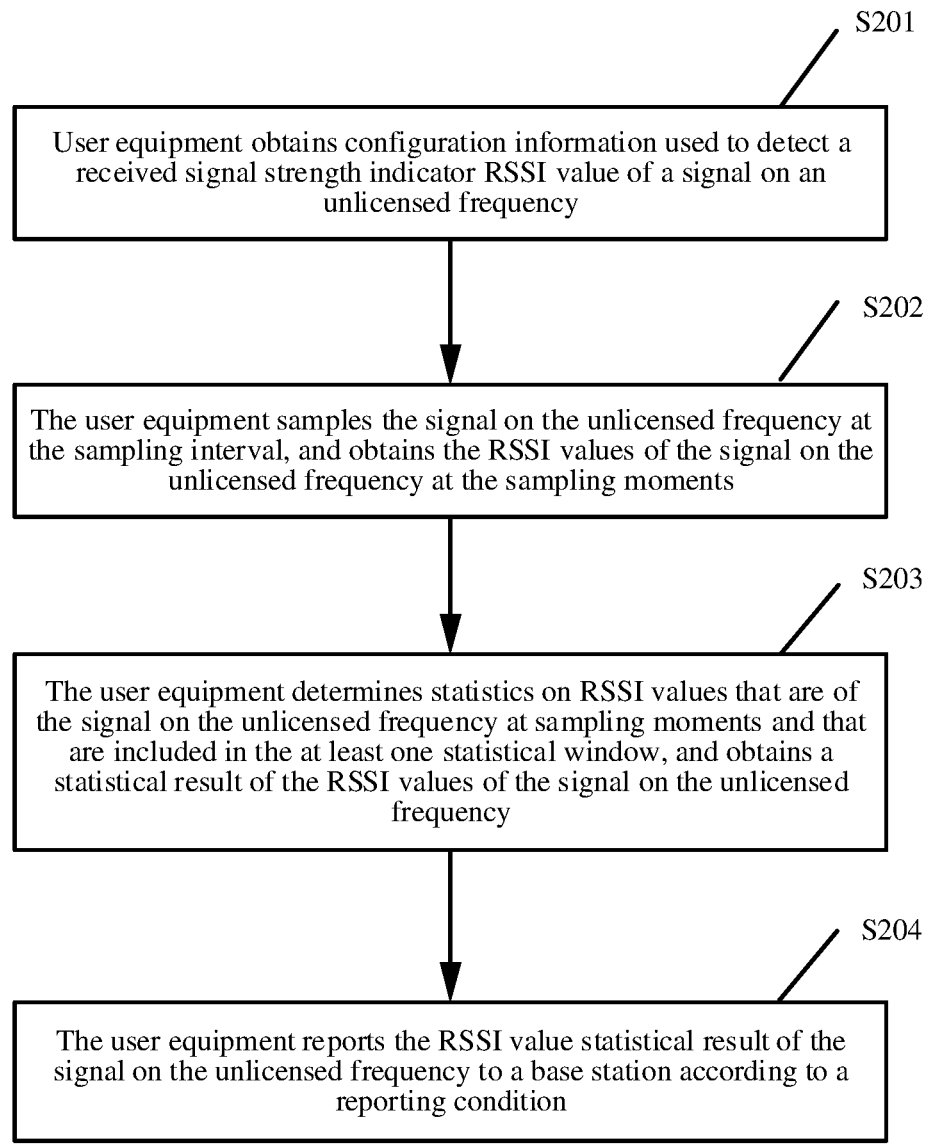
FIG. 6 is a schematic flowchart of another signal processing method according to an embodiment of the present application.

Referring to FIG. 6, FIG. 6 is a schematic flowchart of another signal processing method according to an embodiment of the present application. A difference between the signal processing method shown in FIG. 6 and the signal processing method shown in FIG. 4 lies in that configuration information in the signal processing method shown in FIG. 6 may further include a reporting condition, and a user equipment may report an RSSI value statistical result of a signal on an unlicensed frequency to a base station according to the reporting condition. Specifically, the signal processing method may include the following steps.

S201. The user equipment obtains configuration information used to detect a received signal strength indicator (RSSI) value of a signal on an unlicensed frequency.

The configuration information includes sampling parameter information and a statistical window that correspond to the unlicensed frequency, the sampling parameter information includes a sampling interval, and the at least one statistical window is a time length in which statistics on RSSI values of the signal on the unlicensed frequency at sampling moments are determined.

S202. The user equipment samples the signal on the unlicensed frequency at the sampling interval, and obtains the RSSI values of the signal on the unlicensed frequency at the sampling moments.

S203. The user equipment determines statistics on RSSI values of the signal on the unlicensed frequency at the sampling moments included in the at least one statistical window, and obtains an RSSI value statistical result of the signal on the unlicensed frequency.

S204. The user equipment reports the RSSI value statistical result of the signal on the unlicensed frequency to the base station according to a reporting condition.

In this embodiment of the present application, the user equipment reports the RSSI value statistical result of the signal on the unlicensed frequency to the base station according to the reporting condition, to trigger the base station to select, according to the RSSI value statistical result of the signal on the unlicensed frequency, an idle unlicensed frequency.

In this embodiment of the present application, step S201 to step S203 are the same as step S101 to step S103 in the foregoing embodiment of the present application. Therefore, reference may be made to the related implementations and description in the foregoing embodiment of the present application, and details are not described in this embodiment of the present application again.

In an optional implementation, if the reporting condition in the configuration information is single reporting, in step S204, reporting, by the user equipment, the RSSI value statistical result of the signal on the unlicensed frequency to the base station according to a reporting condition may include: reporting, by the user equipment to the base station, an RSSI value statistical result of the signal on the unlicensed frequency that corresponds to a single statistical window. The user equipment may further control to stop sampling the signal on the unlicensed frequency at the sampling interval. This implementation can not only improve accuracy of an RSSI value according to which the base station serving the user equipment selects an idle unlicensed frequency, but also can reduce power consumption of the user equipment and the base station during single reporting.

In another optional implementation, if the reporting condition in the configuration information is reporting according to a preset reporting period, in step S204, reporting, by the user equipment, the RSSI value statistical result of the signal on the unlicensed frequency to the base station according to a reporting condition may include: determining, by the user equipment, a target quantity of statistical windows included in the preset reporting period; and reporting, to the base station, an RSSI value statistical result of the signal on the unlicensed frequency that corresponds to the target quantity of statistical windows. This implementation can improve accuracy of an RSSI value according to which the base station serving the user equipment selects an idle unlicensed frequency, so that the base station evaluates an idle degree of the unlicensed frequency in each period according to an RSSI value having relatively high accuracy, so as to select an idle unlicensed frequency in each period more accurately.

For example, if the preset reporting period is six seconds, and a time length of a statistical window is two seconds, it may be determined that the target quantity of statistical windows included in the preset reporting period is 6/2=3, and RSSI value statistical results of the signal on the unlicensed frequency that correspond to the three statistical windows may be reported to the base station.

In the signal processing method described in FIG. 6, a user equipment obtains configuration information used to detect an RSSI value of a signal on an unlicensed frequency, samples a signal on each unlicensed frequency according to a sampling interval included in sampling parameter information in the configuration information, obtains RSSI values of the signal on each unlicensed frequency at sampling moments, determines statistics on the RSSI values of the signal on the unlicensed frequency at the sampling moments according to a statistical window, obtains an RSSI value statistical result of the signal on the unlicensed frequency, and reports the RSSI value statistical result of the signal on the unlicensed frequency to a base station according to single reporting or according to a preset reporting period that is indicated by a reporting condition in the configuration information. It can be learnt that, in this embodiment of the present application, not only accuracy of an RSSI value according to which the base station serving the user equipment selects an idle unlicensed frequency can be improved, but also power consumption of the user equipment or the base station can be reduced.

Figure 7:
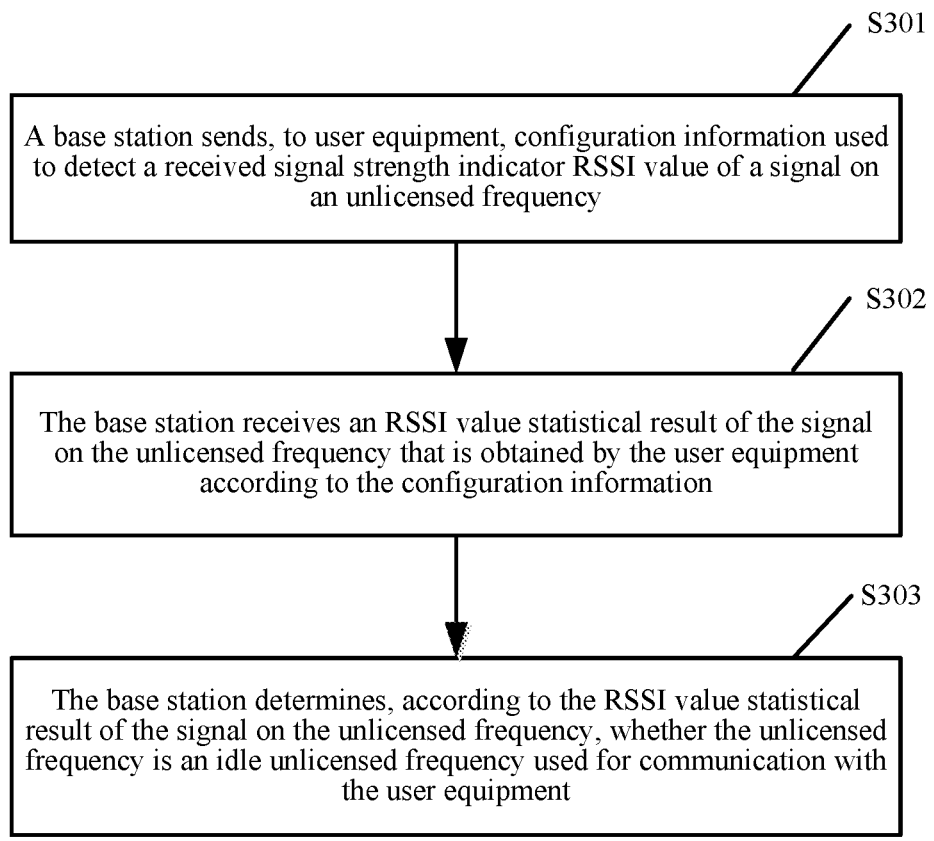
FIG. 7 is a schematic flowchart of yet another signal processing method according to an embodiment of the present application.

Referring to FIG. 7, FIG. 7 is a schematic flowchart of yet another signal processing method according to an embodiment of the present application. The signal processing method shown in FIG. 7 is described from a base station side. Specifically, as shown in FIG. 7, the signal processing method may include the following steps.

S301. A base station sends, to a user equipment, configuration information used to detect a received signal strength indicator (RSSI) value of a signal on an unlicensed frequency.

In this embodiment of the present application, the configuration information includes sampling parameter information and/or a statistical window that are/is of the signal on the unlicensed frequency, and the sampling parameter information includes a sampling interval. The user equipment samples the signal on the unlicensed frequency at the sampling interval, and obtains sampled RSSI values of the signal on the unlicensed frequency, the user equipment determines statistics on RSSI values of the signal on the unlicensed frequency at sampling moments included in at least one statistical window, and obtains an RSSI value statistical result of the signal on the unlicensed frequency; and the user equipment sends the RSSI value statistical result of the signal on the unlicensed frequency to the base station.

S302. The base station receives an RSSI value statistical result of the signal on the unlicensed frequency that is obtained by the user equipment according to the configuration information.

S303. The base station determines, according to the RSSI value statistical result of the signal on the unlicensed frequency, whether the unlicensed frequency is an idle unlicensed frequency used for communication with the user equipment.

In this embodiment of the present application, the configuration information may further include a reporting condition used to trigger the user equipment to report the RSSI value statistical result of the signal on the unlicensed frequency, and the reporting condition includes any one of performing single reporting of an RSSI value statistical result corresponding to a single statistical window, performing periodical reporting according to a preset reporting period, or performing event-based reporting according to information that indicates a preset event and that is included in the RSSI value statistical result.

In this embodiment of the present application, the configuration information may further include at least one threshold, and the at least one threshold is used to divide the RSSI values of the signal on the unlicensed frequency at the sampling moments into multiple RSSI value ranges, so that ratios of quantities of RSSI values at sampling moments that are included in the RSSI value ranges are used as the RSSI value statistical result of the signal on the unlicensed frequency.

In this embodiment of the present application, the RSSI value statistical result of the signal on the unlicensed frequency further includes at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information includes wireless local area network (WLAN) information or cell configuration information.

In this embodiment of the present application, the sampling parameter information further includes a sampling window and a sampling window period that correspond to the unlicensed frequency, the sampling window is used to indicate a time length in which the signal on the unlicensed frequency is sampled in each sampling window period, and a time length of the sampling interval is less than the time length of the sampling window. Multiple different unlicensed frequencies in the configuration information may correspond to different sampling windows and sampling window periods.

In this embodiment of the present application, the sampling parameter information further includes a measurement time length and a measurement period, the measurement time length is used to indicate a time length in which the signal on the unlicensed frequency is sampled in each measurement period, and a time length of the sampling interval is less than the time length of the measurement time length. Multiple unlicensed frequencies in the configuration information may have a same measurement time length and a same measurement period.

In this embodiment of the present application, before performing step S301, the base station may further send a query instruction, to query the user equipment whether the user equipment can obtain the RSSI value statistical result of the signal on the unlicensed frequency and report the RSSI value statistical result to the base station, or whether the user equipment is willing to perform a related operation of obtaining the RSSI value statistical result of the signal on the unlicensed frequency and reporting the RSSI value statistical result to the base station. If the user equipment returns a confirmation message in response to the query instruction, step S301 to step S303 may be performed.

In the signal processing method described in FIG. 7, a base station may send configuration information used to detect an RSSI value of a signal on an unlicensed frequency to user equipment, and receive an RSSI value statistical result of the signal on the unlicensed frequency that is obtained by the user equipment according to the configuration information. In this embodiment of the present application, the user equipment obtains the RSSI value statistical result of the signal on the unlicensed frequency according to the configuration information, so that it can be avoided that the base station serving the user equipment cannot detect a signal of a hidden base station in a process of obtaining the RSSI value statistical result of the signal on the unlicensed frequency and consequently the user equipment is interfered by the hidden base station when the user equipment uses a selected unlicensed frequency. In addition, the base station determines, according to the RSSI value statistical result of the signal on the unlicensed frequency, whether the unlicensed frequency is an idle unlicensed frequency used for communication with the user equipment. Therefore, accuracy of an RSSI value according to which the base station selects an idle unlicensed frequency is improved, and further, accuracy of the determined idle unlicensed frequency can be improved.

Figure 8:
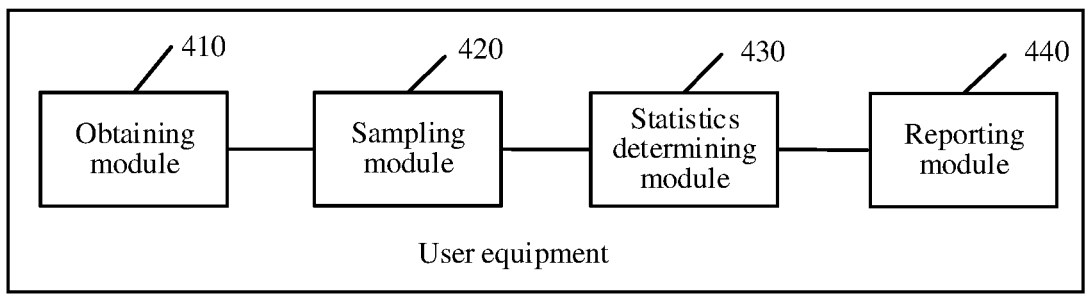
FIG. 8 is a schematic structural diagram of a user equipment according to an embodiment of the present application.

Referring to FIG. 8, FIG. 8 is a schematic structural diagram of a user equipment according to an embodiment of the present application. As shown in FIG. 8, the user equipment may include an obtaining module 410, a sampling module 420, a statistics determining module 430, and a reporting module 440.

The obtaining module 410 is configured to obtain configuration information used to detect a received signal strength indicator (RSSI) value of a signal on an unlicensed frequency.

The configuration information includes sampling parameter information and at least one statistical window that are of the signal on the unlicensed frequency, the sampling parameter information includes a sampling interval, and the at least one statistical window is a time length in which statistics on RSSI values of the signal on the unlicensed frequency at sampling moments are determined.

In this embodiment of the present application, the sampling parameter information and the statistical window in the configuration information used to detect the RSSI value of the signal on the unlicensed frequency may be received from a base station, or may be preset by the user equipment. A manner of receiving the configuration information from the base station may be setting the configuration information by the base station according to a power consumption requirement or a requirement for accuracy of selecting an idle unlicensed frequency. A manner of directly obtaining the configuration information from the user equipment can reduce communications resources, signaling overheads, or the like between the user equipment and the base station. The configuration information includes multiple different unlicensed frequencies. The unlicensed frequencies may correspond to different sampling parameter information, or may correspond to same sampling parameter information. This is not limited in this embodiment of the present application. Specifically, the sampling interval indicates a time interval between every two times of sampling. For example, the sampling interval may be one subframe or one symbol, indicating that sampling is performed once in each subframe or each symbol. Further, each time of sampling includes sampling duration that indicates a measurement time length of each time of sampling by the user equipment. If the sampling duration is equal to the sampling interval, it indicates that the user equipment performs continuous sampling. The sampling duration may be a predefined time length, or a time length configured by the base station.

The sampling module 420 is configured to: sample the signal on the unlicensed frequency at the sampling interval, and obtain the RSSI values of the signal on the unlicensed frequency at the sampling moments.

The statistics determining module 430 is configured to: determine statistics on the RSSI values of the signal on the unlicensed frequency at the sampling moments included in the at least one statistical window, and obtain an RSSI value statistical result of the signal on the unlicensed frequency.

The reporting module 440 is configured to report the RSSI value statistical result of the signal on the unlicensed frequency to the base station.

For example, referring to the schematic diagram of sampling of the signal on the unlicensed frequency shown in FIG. 5a, the sampling module 420 may sample the signal on the unlicensed frequency at the sampling interval, and obtain RSSI values of the signal on the unlicensed frequency at sampling moments. The RSSI values at the sampling moments indicate idle degrees of the unlicensed frequency at the sampling moments, and a smaller RSSI value indicates that the unlicensed frequency is idler at a sampling moment. In addition, the statistics determining module 430 may determine statistics on the RSSI values of the signal on the unlicensed frequency at the sampling moments using a time length corresponding to the statistical window as a unit, and obtains an RSSI value statistical result of the signal on the unlicensed frequency. The RSSI value statistical result of the signal on the unlicensed frequency may include RSSI value statistical results of the signal on the unlicensed frequency that correspond to multiple statistical windows.

Figure 9:
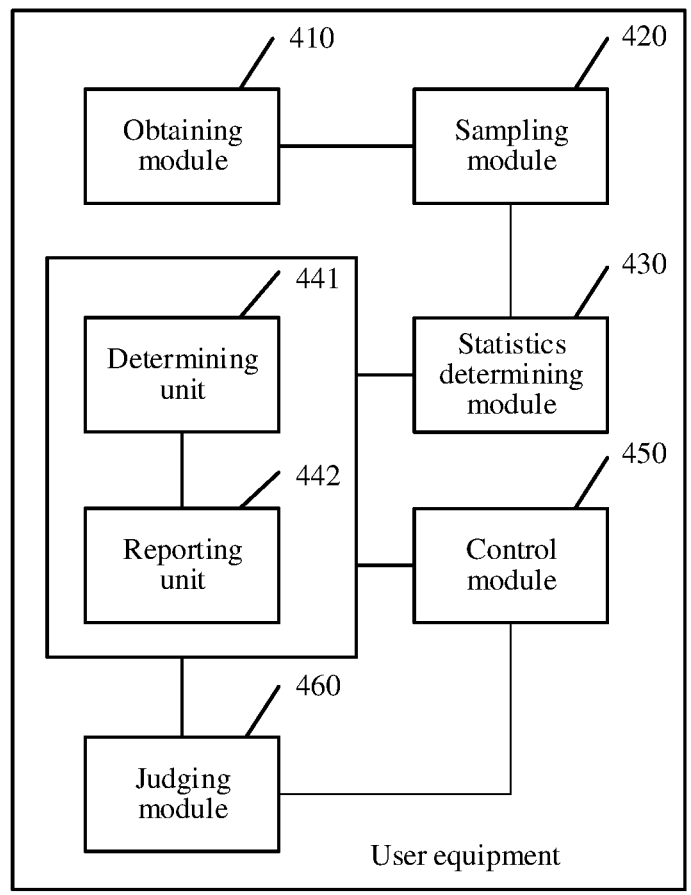
FIG. 9 is a schematic structural diagram of another user equipment according to an embodiment of the present application.

Also referring to FIG. 9, FIG. 9 is a schematic structural diagram of another user equipment according to an embodiment of the present application. The user equipment shown in FIG. 9 is obtained by optimizing the user equipment shown in FIG. 8. The user equipment shown in FIG. 9 is specifically as follows.

In an optional implementation, the configuration information may further include a reporting condition and the reporting condition indicates single reporting, and the reporting module 440 is specifically configured to report, to the base station, an RSSI value statistical result of the signal on the unlicensed frequency that corresponds to a single statistical window of the at least one statistical window.

Correspondingly, the user equipment shown in FIG. 9 may further include a control module 450, configured to: after the reporting module 440 reports, to the base station, the RSSI value statistical result of the signal on the unlicensed frequency that corresponds to the single statistical window of the at least one statistical window, control to stop sampling the signal on the unlicensed frequency at the sampling interval.

In an optional implementation, the reporting condition in the configuration information may further indicate reporting according to a preset reporting period, and the reporting module 440 in the user equipment shown in FIG. 9 may include: a determining unit 441, configured to determine a quantity of statistical windows included in the preset reporting period; and a reporting unit 442, configured to report, to the base station, an RSSI value statistical result of the signal on the unlicensed frequency that corresponds to the quantity of statistical windows of the at least one statistical window that is determined by the determining unit 441.

In still another optional implementation, the reporting condition in the configuration information may further indicate reporting according to a preset event, and the user equipment shown in FIG. 9 may further include a judging module 460, configured to: determine whether the RSSI value statistical result includes information indicating the preset event; and if it is determined that the RSSI value statistical result includes the information indicating the preset event, trigger the reporting module to perform the operation of reporting the RSSI value statistical result of the signal on the unlicensed frequency to the base station.

It should be noted that, the modules or units corresponding to the reporting manners described in the foregoing three implementations in this embodiment of the present application may all exist in the user equipment, or one of the modules or units may exist in the user equipment. An example in which all the modules or units exist is used in FIG. 9 in this embodiment of the present application, and a corresponding reporting manner is used according to specific content of the reporting condition.

In this embodiment of the present application, the configuration information may further include at least one RSSI threshold. Correspondingly, the statistics determining module 430 is specifically configured to: divide, for each of the at least one statistical window according to the at least one RSSI threshold, RSSI values of the signal on the unlicensed frequency at sampling moments included in the statistical window into at least one RSSI value range; and obtain a ratio of a quantity of RSSI values at sampling moments that are included in the at least one RSSI value range to a total quantity of the RSSI values of the signal on the unlicensed frequency at the sampling moments included in the statistical window, and use the ratio of the at least one RSSI value range as a statistical result. Specifically, reference may be made to related descriptions in FIG. 5a in the foregoing embodiment of the present application, and details are not described herein again.

In this embodiment of the present application, the RSSI value statistical result of the signal on the unlicensed frequency may further include at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information may include wireless local area network (WLAN) configuration information or cell configuration information.

In an optional implementation, the sampling parameter information further includes a sampling window and a sampling window period that correspond to the unlicensed frequency, the sampling window is used to indicate a time length in which the signal on the unlicensed frequency is sampled in each sampling window period, and a time length of the sampling interval is less than the time length of the sampling window, and the sampling module is specifically configured to: sample, for the signal on the unlicensed frequency, the signal on the unlicensed frequency at the sampling interval according to the time length of the sampling window and the sampling window period, and obtain the RSSI values of the signal on the unlicensed frequency at the sampling moments. Specifically, for sampling of the signal on the unlicensed frequency by the sampling module 420 according to the time length of the sampling window and the sampling window period, reference may be made to related descriptions corresponding to FIG. 5b in the foregoing embodiment of the present application, and details are not described herein again.

In another optional implementation, the sampling parameter information further includes a measurement time length and a measurement period, and the sampling module is specifically configured to: sample, for the signal on the unlicensed frequency, the signal on the unlicensed frequency at the sampling interval according to the measurement time length and the measurement period, and obtain the RSSI values of the signal on the unlicensed frequency at the sampling moments. Specifically, for sampling of the signal on the unlicensed frequency by the sampling module 420 according to the measurement time length and the measurement period, reference may be made to related descriptions corresponding to FIG. 5c in the foregoing embodiment of the present application, and details are not described herein again.

In this embodiment of the present application, any one of the statistical window, the sampling parameter information, or the reporting condition that is included in the configuration information is preset by the user equipment or obtained from the base station serving the user equipment.

In this embodiment of the present application, the user equipment includes a physical layer and a radio resource control layer, where the physical layer may include the sampling module to perform the related operations of the sampling module, and send the RSSI values of the signal on the unlicensed frequency at the sampling moments to the radio resource control layer, and correspondingly, the radio resource control layer may include the statistics determining module, and may determine statistics on the RSSI values of the signal on the unlicensed frequency at the sampling moments according to the at least one statistical window, and obtain the RSSI value statistical result of the signal on the unlicensed frequency; or, the physical layer may include the sampling module and the statistics determining module, and may perform the operations of the sampling module to sample the signal on the unlicensed frequency at the sampling interval, and obtain the RSSI values of the signal on the unlicensed frequency at the sampling moments, and perform the operations of the statistics determining module to determine statistics on the RSSI values of the signal on the unlicensed frequency at the sampling moments according to the at least one statistical window, obtain the RSSI value statistical result of the signal on the unlicensed frequency, and send the RSSI value statistical result of the signal on the unlicensed frequency to the radio resource control layer.

In this embodiment of the present application, the configuration information may further include frequency indication information, and the user equipment determines, according to the frequency indication information, the unlicensed frequency on which the RSSI value statistical result of the signal needs to be obtained.

Figure 11:
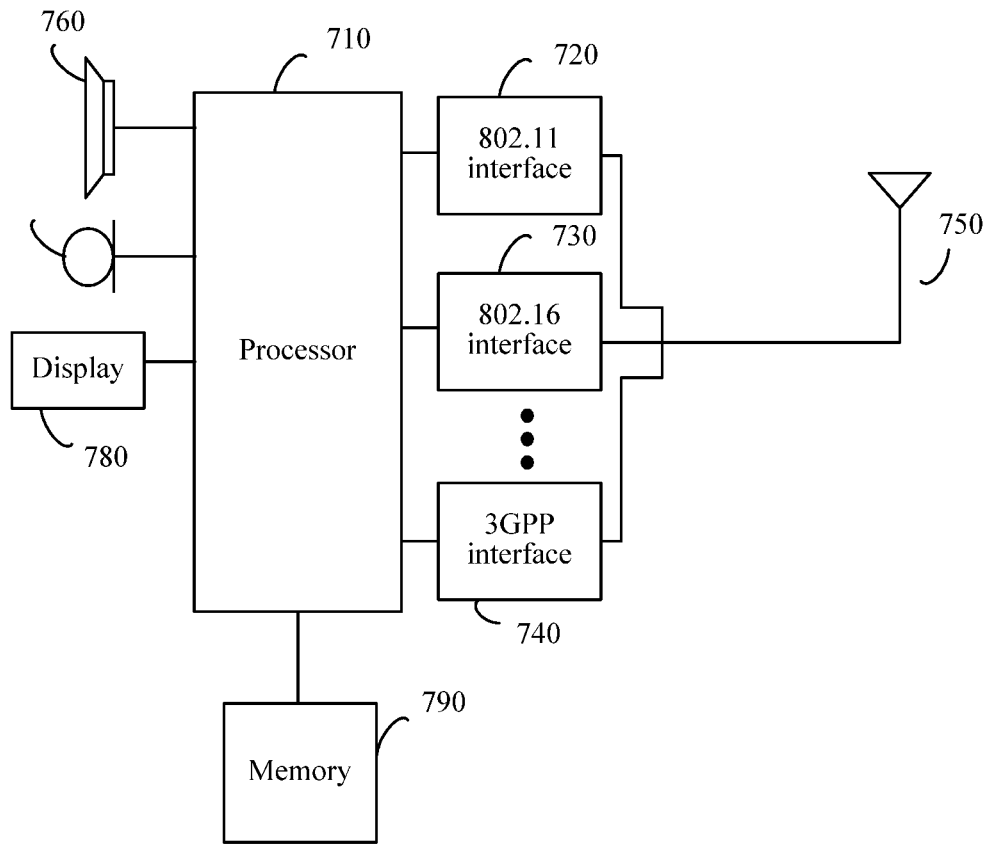
FIG. 11 is a schematic structural diagram of another user equipment according to an embodiment of the present application.

In addition, referring to FIG. 11, FIG. 11 is a schematic structural diagram of another user equipment according to an embodiment of the present application. The user equipment may include a processor 710, a memory 790, and an antenna 750. The processor 710 invokes program code in the memory 790, and may send processed information using the antenna 750 over an 802.11 interface 720, an 802.16 interface 730, or a 3GPP interface 740, or receive, using the antenna 750, information sent by another terminal to the user equipment. Specifically, the memory 790 may store program code corresponding to the obtaining module, the sampling module, the statistics determining module, and the reporting module. The processor 710 may invoke the program code in the memory 790, to perform the operations of the obtaining module, the sampling module, the statistics determining module, and the reporting module using the 802.11 interface 720, the 802.16 interface 730, or the 3GPP interface 740 (another communications interface may also be used, and this is not limited in this embodiment of the present application), and the antenna 750, to report an RSSI value statistical result of a signal on an unlicensed frequency to a base station.

Further, the memory 790 may store program code corresponding to the control module or the judging module. The processor 710 may invoke the program code in the memory 790, to perform the related operations of the control module or the judging module. For a specific optional implementation of an operation of the processor 710, reference may be made to operations and descriptions of related modules in the embodiments of the present application, and details are not described herein again.

Specifically, the user equipment described in FIG. 8, FIG. 9, or FIG. 11 in the embodiments of the present application may perform some or all of the processes in the embodiments of the signal processing method described in the embodiments of the present application with reference to FIG. 7.

In the user equipments shown in FIG. 8 and FIG. 9, the obtaining module may obtain configuration information used to detect a received signal strength indicator (RSSI) value of a signal on an unlicensed frequency, the signal on the unlicensed frequency is sampled according to a sampling interval in the configuration information, RSSI values of the signal on the unlicensed frequency at sampling moments are obtained, statistics on RSSI values of the signal on the unlicensed frequency at sampling moments included in at least one statistical window in the configuration information are determined, and an RSSI value statistical result of the signal on the unlicensed frequency is obtained and is reported to a base station. It can be learnt that, in this embodiment of the present application, the user equipment samples the signal on the unlicensed frequency, and can obtain all signals using the unlicensed frequency within a particular range from the user equipment, thereby avoiding interference of a hidden base station to the user equipment when the user equipment uses a selected idle unlicensed frequency. Further, in this embodiment of the present application, RSSI values of the signal on the unlicensed frequency at multiple sampling moments are obtained, and statistics on the RSSI values of the signal on the unlicensed frequency at the multiple sampling moments are determined to obtain the RSSI value statistical result of the signal on the unlicensed frequency, thereby further improving accuracy of an RSSI value according to which the base station serving the user equipment selects an idle unlicensed frequency. Further, in the user equipment shown in FIG. 9, the reporting module may report the RSSI value statistical result of the signal on the unlicensed frequency to the base station according to three reporting manners, that is, single reporting, reporting according to a preset reporting period, and reporting according to a preset event, that are indicated by a reporting condition in the configuration information. Therefore, not only accuracy of an RSSI value according to which the base station serving the user equipment selects an idle unlicensed frequency can be improved, but also power consumption of the user equipment or the base station can be reduced.

Figure 10:
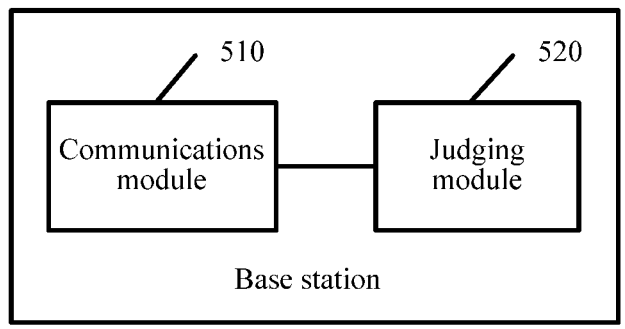
FIG. 10 is a schematic structural diagram of a base station according to an embodiment of the present application.

Referring to FIG. 10, FIG. 10 is a schematic structural diagram of a base station according to an embodiment of the present application. As shown in FIG. to, the base station may include a communications module 510 and a judging module 520.

The communications module 510 is configured to send, a to user equipment, configuration information used to detect a received signal strength indicator (RSSI) value of a signal on an unlicensed frequency, where the configuration information includes frequency indication information, and the user equipment determines, according to the frequency indication information, the unlicensed frequency on which an RSSI value statistical result of the signal needs to be obtained.

The communications module 510 is further configured to receive the RSSI value statistical result of the signal on the unlicensed frequency that is obtained by the user equipment according to the configuration information.

The judging module 520 is configured to determine, according to the RSSI value statistical result of the signal on the unlicensed frequency received by the communications module 510, whether the unlicensed frequency is an idle unlicensed frequency used for communication with the user equipment.

In this embodiment of the present application, the configuration information includes sampling parameter information and/or at least one statistical window that are/is used to sample the signal on the unlicensed frequency, the sampling parameter information includes a sampling interval, and the at least one statistical window is a time length in which statistics on RSSI values of the signal on the unlicensed frequency at sampling moments are determined. Specifically, the sampling interval indicates a time interval between every two times of sampling. For example, the sampling interval may be one subframe or one symbol, indicating that sampling is performed once in each subframe or each symbol. Further, each time of sampling includes sampling duration that indicates a measurement time length of each time of sampling by the user equipment. If the sampling duration is equal to the sampling interval, it indicates that the user equipment performs continuous sampling. The sampling duration may be a predefined time length, or a time length configured by the base station.

In this embodiment of the present application, the configuration information further includes a reporting condition used to trigger the user equipment to report the RSSI value statistical result of the signal on the unlicensed frequency, and the reporting condition includes any one of performing single reporting of an RSSI value statistical result of the signal on the unlicensed frequency that corresponds to a single statistical window of the at least one statistical window, performing periodical reporting according to a preset reporting period, or performing event-based reporting according to information that indicates a preset event and that is included in the RSSI value statistical result of the signal on the unlicensed frequency.

In this embodiment of the present application, the configuration information may further include at least one RSSI threshold, and the at least one RSSI threshold is used to divide, for each of the at least one statistical window, RSSI values of the signal on the unlicensed frequency at sampling moments included in the statistical window into at least one RSSI value range, and a ratio of a quantity of RSSI values at sampling moments that are included in the at least one RSSI value range to a total quantity of the RSSI values of the signal on the unlicensed frequency at the sampling moments included in the statistical window is used as the RSSI value statistical result of the signal on the unlicensed frequency.

In this embodiment of the present application, the RSSI value statistical result of the signal on the unlicensed frequency further includes at least one of or a combination of the following information: a total quantity of the RSSI values of the signal on the unlicensed frequency at the sampling moments included in the at least one statistical window, the sampling interval at which the signal on the unlicensed frequency is sampled, an average value of the RSSI values of the signal on the unlicensed frequency at the sampling moments, or signal attribute information of the signal on the unlicensed frequency, where the signal attribute information includes wireless local area network (WLAN) information or cell configuration information.

In this embodiment of the present application, the sampling parameter information further includes a sampling window and a sampling window period that correspond to the unlicensed frequency, the sampling window is used to indicate a time length in which the signal on the unlicensed frequency is sampled in each sampling window period, and a time length of the sampling interval is less than the time length of the sampling window.

In this embodiment of the present application, the sampling parameter information further includes a measurement time length and a measurement period, the measurement time length is used to indicate a time length in which the signal on the unlicensed frequency is sampled in each measurement period, and a time length of the sampling interval is less than the time length of the measurement time length.

Figure 12:
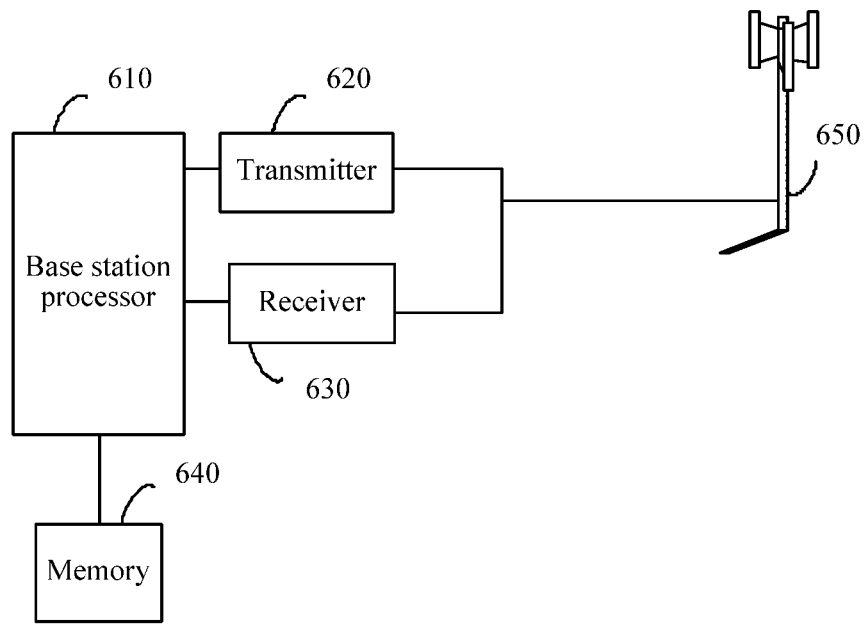
FIG. 12 is a schematic structural diagram of another base station according to an embodiment of the present application.

In addition, referring to FIG. 12, FIG. 12 is a schematic structural diagram of another base station according to an embodiment of the present application. The base station shown in FIG. 12 may include a base station processor 610, a transmitter 620, a receiver 630, a memory 640, and an antenna 650. The memory 640 may store program code corresponding to the communications module and the judging module. The base station processor 610 may invoke the program code in the memory 610, send, to user equipment using the transmitter 620, configuration information used to detect a received signal strength indicator RSSI value of a signal on an unlicensed frequency, and receive, using the receiver 630, an RSSI value statistical result of the signal on the unlicensed frequency that is obtained by the user equipment according to the configuration information. Correspondingly, the base station processor 610 may invoke the program code in the memory 610, to determine whether the unlicensed frequency is an idle unlicensed frequency used for communication with the user equipment. For a specific optional implementation of an operation of the base station processor 610, reference may be made to operations and descriptions of related modules in the embodiments of the present application, and details are not described herein again.

Specifically, the base station described in FIG. 10 to or FIG. 12 in the embodiment of the present application may perform some or all of the processes in the embodiments of the signal processing method described in the embodiments of the present application with reference to FIG. 4 or FIG. 6.

In the base station shown in FIG. to, the communications module may send configuration information used to detect an RSSI value of a signal on an unlicensed frequency to user equipment, and receive an RSSI value statistical result of the signal on the unlicensed frequency that is obtained by the user equipment according to the configuration information. In this embodiment of the present application, the user equipment obtains the RSSI value statistical result of the signal on the unlicensed frequency according to the configuration information, so that it can be avoided that the base station serving the user equipment cannot detect a signal of a hidden base station in a process of obtaining the RSSI value statistical result of the signal on the unlicensed frequency and consequently the user equipment is interfered by the hidden base station when the user equipment uses a selected unlicensed frequency. In addition, the judging module determines, according to the RSSI value statistical result of the signal on the unlicensed frequency, whether the unlicensed frequency is an idle unlicensed frequency used for communication with the user equipment. Therefore, in one aspect, accuracy of an RSSI value according to which the base station selects an idle unlicensed frequency is improved, and further, accuracy of the determined idle unlicensed frequency can be improved.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The signal processing method and the related device disclosed in the embodiments of the present application are described in detail above. The principle and implementation of the present application are described herein using specific examples. The description about the embodiments of the present application is merely provided to help understand the method and core ideas of the present application. In addition, a person of ordinary skill in the art can make variations and modifications to the present application in terms of the specific implementations and application scopes according to the ideas of the present application. Therefore, the content of specification shall not be construed as a limit to the present application.

The invention claimed is:

1. A method, comprising:
   sampling, by a user equipment, a signal on a unlicensed frequency at a sampling interval, according to one or more measurement time windows within a statistical window, to obtain a plurality of received signal strength indicator (RSSI) values of the signal on the unlicensed frequency at sampling moments within the statistical window, wherein a length of each measurement time window of the one or more measurement time windows is a measurement time length and specifies a duration within which the signal is sampled at the sampling interval, a measurement periodicity specifies a duration between starting times of two measurement time windows, and the measurement time length is less than the measurement periodicity;
   obtaining, by the user equipment, an RSSI value statistical result of the signal on the unlicensed frequency based on the plurality of RSSI values obtained by the sampling within the statistical window, wherein obtaining the RSSI value statistical result comprises:
      determining, by the user equipment, at least one RSSI value from the plurality of RSSI values in the statistical window, each RSSI value of the at least one RSSI value being greater than a RSSI threshold; and
      obtaining a ratio of a quantity of the determined at least one RSSI value to a quantity of the plurality of RSSI values in the statistical window, wherein the RSSI value statistical result comprises the ratio; and
   reporting, by the user equipment, the RSSI value statistical result of the signal on the unlicensed frequency to a base station.

2. The method according to claim 1, wherein the RSSI value statistical result further comprises an average of the plurality of RSSI values.

3. The method according to claim 1, wherein the method further comprises:
   obtaining, by the user equipment from the base station, information about the statistical window, the measurement time length and the measurement periodicity.

4. The method according to claim 1, wherein the method further comprises:
   obtaining, by the user equipment, frequency indication information; and
   determining, by the user equipment, according to the frequency indication information, the unlicensed frequency on which the RSSI value statistical result of the signal is obtained.

5. An apparatus, comprising:
   a processor; and
   a non-transitory computer-readable storage medium storing a program to be executed by the processor, the program including instructions to:
      sample a signal on a unlicensed frequency at a sampling interval, according to one or more measurement time windows within a statistical window, to obtain a plurality of received signal strength indicator (RSSI) values of the signal on the unlicensed frequency at sampling moments within the statistical window, wherein a length of each measurement time window of the one or more measurement time windows is a measurement time length and specifies a duration within which the signal is sampled at the sampling interval, a measurement periodicity specifies a duration between starting times of two measurement time windows, and the measurement time length is less than the measurement periodicity;
      obtain an RSSI value statistical result of the signal on the unlicensed frequency based on the plurality of RSSI values obtained by the sampling within the statistical window, wherein obtaining the RSSI value statistical result comprises:
         determining at least one RSSI value from the plurality of RSSI values in the statistical window, each RSSI value of the at least one RSSI value being greater than a RSSI threshold; and
         obtaining a ratio of a quantity of the determined at least one RSSI value to a quantity of the plurality of RSSI values in the statistical window, wherein the RSSI value statistical result comprises the ratio; and
      report the RSSI value statistical result of the signal on the unlicensed frequency to a base station.

6. The apparatus according to claim 5, wherein the RSSI value statistical result further comprises an average of the plurality of RSSI values.

7. The apparatus according to claim 5, wherein the program further includes instructions to:
   obtain, from the base station, information of the statistical window, the measurement time length and the measurement periodicity.

8. The apparatus according to claim 5, wherein the program further includes instructions to:
   obtain frequency indication information; and
   determine, according to the frequency indication information, the unlicensed frequency on which the RSSI value statistical result of the signal is obtained.

9. An apparatus, comprising:
   a processor; and
   a non-transitory computer-readable storage medium storing a program to be executed by the processor, the program including instructions to:
      send, to a user equipment, configuration information for the user equipment to use to determine a received signal strength indicator (RSSI) value statistical result of a signal on an unlicensed frequency, the configuration information indicating a statistical window and one or more measurement time windows within the statistical window, the RSSI value statistical result being determined using a plurality of RSSI values of the signal which are obtained by sampling within the statistical window according to the one or more measurement time windows within the statistical window, wherein a length of each measurement time window of the one or more measurement time windows is a measurement time length and specifies a duration of a measurement window within which the signal is sampled at a sampling interval, a measurement periodicity specifies a duration between starting times of two measurement time windows, and the configuration information further indicates an RSSI threshold to use to determine, from the plurality of RSSI values, at least one RSSI value greater than the RSSI threshold, and wherein the RSSI value statistical result comprises a ratio of a quantity of the at least one RSSI value in the plurality of RSSI values to a quantity of the plurality of RSSI values in the statistical window; and receive the RSSI value statistical result of the signal on the unlicensed frequency that is determined by the user equipment according to the configuration information.

10. The apparatus according to claim 9, wherein the program further includes instructions to:
determine, according to the RSSI value statistical result of the signal on the unlicensed frequency, whether the unlicensed frequency is an idle unlicensed frequency that can be used by the apparatus for communication with the user equipment.

11. The apparatus according to claim 9, wherein the RSSI value statistical result further comprises an average of the plurality of RSSI values obtained by the sampling in the statistical window.

12. The apparatus according to claim 9, wherein the program further includes instructions to:
send, to the user equipment, frequency indication information for the user equipment to determine the unlicensed frequency on which the RSSI value statistical result of the signal is obtained.

13. The apparatus according to claim 5, wherein the apparatus is a user equipment.

14. The apparatus according to claim 9, wherein the apparatus is a base station.

* * * * *